(12) United States Patent
Nykyforov

(10) Patent No.: US 11,978,139 B2
(45) Date of Patent: May 7, 2024

(54) SYSTEMS AND METHODS FOR ASSESSING TEXT LEGIBILITY IN ELECTRONIC DOCUMENTS

(71) Applicant: CIMPRESS SCHWEIZ GMBH, Winterthur (CH)

(72) Inventor: Vyacheslav Nykyforov, Littleton, MA (US)

(73) Assignee: CIMPRESS SCHWEIZ GMBH, Winterthur (CH)

( * ) Notice: Subject to any disclaimer, the term of this patent is extended or adjusted under 35 U.S.C. 154(b) by 342 days.

(21) Appl. No.: 17/390,482

(22) Filed: Jul. 30, 2021

(65) Prior Publication Data
US 2022/0036611 A1 Feb. 3, 2022

Related U.S. Application Data

(60) Provisional application No. 63/059,403, filed on Jul. 31, 2020.

(51) Int. Cl.
| | |
|---|---|
| *G06T 11/20* | (2006.01) |
| *G06F 40/109* | (2020.01) |
| *G06N 5/04* | (2023.01) |
| *G06N 20/00* | (2019.01) |
| *G06T 11/60* | (2006.01) |
| *G06V 10/22* | (2022.01) |
| *G06V 30/10* | (2022.01) |

(52) U.S. Cl.
CPC .......... *G06T 11/206* (2013.01); *G06F 40/109* (2020.01); *G06N 5/04* (2013.01); *G06N 20/00* (2019.01); *G06T 11/60* (2013.01); *G06V 10/22* (2022.01); *G06V 30/10* (2022.01)

(58) Field of Classification Search
None
See application file for complete search history.

(56) References Cited

U.S. PATENT DOCUMENTS

| | | |
|---|---|---|
| 8,891,874 B1 | 11/2014 | Larson |
| 9,542,907 B2 | 1/2017 | Kocienda et al. |
| 10,395,393 B2 * | 8/2019 | Ma ........................ G06V 30/162 |

(Continued)

OTHER PUBLICATIONS

Landy et al., Texture segregation and orientation gradient, Vision Research, 31(4):679-91 (1991).

(Continued)

*Primary Examiner* — Helen Zong
(74) *Attorney, Agent, or Firm* — MARSHALL, GERSTEIN & BORUN LLP

(57) ABSTRACT

Systems and methods for assessing text legibility in an electronic document are disclosed. According to certain aspects, the electronic document may include a text layer and a background layer, and an electronic device may generate a text mask comprising a set of glyphs at certain positions. The electronic device may analyze the text mask to generate an output comprising a set of bounding boxes that indicate legibility degrees of the respective glyphs included in the text mask. The electronic device may display the output for review and assessment by a user, who may use the electronic device to facilitate any modifications to the electronic document.

17 Claims, 19 Drawing Sheets
(8 of 19 Drawing Sheet(s) Filed in Color)

(56) References Cited

U.S. PATENT DOCUMENTS

| | | | |
|---|---|---|---|
| 2006/0072830 A1* | 4/2006 | Nagarajan | G06V 30/412 |
| | | | 375/E7.2 |
| 2007/0189615 A1* | 8/2007 | Liu | G06V 30/162 |
| | | | 382/232 |
| 2014/0016151 A1* | 1/2014 | Malik | G09G 5/026 |
| | | | 345/589 |
| 2014/0258895 A1* | 9/2014 | Zhang | G06F 9/451 |
| | | | 715/762 |
| 2016/0173944 A1* | 6/2016 | Kilar | G06F 3/04886 |
| | | | 725/12 |
| 2021/0073514 A1* | 3/2021 | Sangala | G06F 18/22 |
| 2021/0110586 A1* | 4/2021 | Gopalakrishnan | G06T 11/60 |
| 2021/0142083 A1* | 5/2021 | Nakatani | G06V 30/1983 |
| 2022/0036108 A1* | 2/2022 | Zhang | G06V 20/62 |
| 2022/0044375 A1* | 2/2022 | Liu | G06T 5/008 |

OTHER PUBLICATIONS

International Application No. PCT/IB2021/056982, International Search Report and Written Opinion, dated Oct. 29, 2021.

\* cited by examiner

SYSTEMS AND METHODS FOR ASSESSING TEXT LEGIBILITY IN ELECTRONIC DOCUMENTS

CROSS-REFERENCE TO RELATED APPLICATIONS

This application claims priority to U.S. Patent Application No. 63/059,403, filed Jul. 31, 2020, the disclosure of which is hereby incorporated by reference in its entirety.

FIELD

The present disclosure is directed to improvements related to analyzing digital designs and assessing components thereof. More particularly, the present disclosure is directed to platforms and technologies for assessing the legibility of textual content included in digital designs.

BACKGROUND

Various printing and design services (e.g., via websites) that enable users to design products are well known and widely used by many consumers, professionals, and businesses. Personalized products may include both printed paper products and customized promotional products including, for instance, various articles of clothing such as t-shirts. The services offer a way for users to upload completed or partially-completed pages or images, as well as create and edit designs. Further, the services enable users to include, add, and/or modify background images, colors, and/or textual content.

However, there are situations in which the textual content may not be legible (or at least, highly legible), especially in situations in which users add text to background images. In particular, textual content may lack a degree of legibility because of its size, color, contrast, and/or positioning relative to the remainder of the design, among other characteristics. Users may not realize that certain designs have poor text legibility, or may not know how to correct for poor text legibility. This can lead to frustration during the design process as well as finished products that have poor text legibility.

Accordingly, there is an opportunity for systems and methods to automatically analyze digital designs to assess text legibility, and produce an output indicating text legibility for review and assessment by users.

SUMMARY

In an embodiment, a computer-implemented method of assessing text legibility in an electronic document comprising a background layer and a text layer is provided. The computer-implemented method may include: generating, by a computer processor from the text layer of the electronic document, a text mask indicating textual or graphical content included in the text layer, the text mask comprising a set of glyphs respectively at a set of positions in the text layer; generating, by the computer processor from the text mask, a set of bounding boxes for the set of glyphs, the set of bounding boxes respectively positioned at the set of positions of the set of glyphs; analyzing, by the computer processor, the text mask to assess, for each glyph of the set of glyphs, a legibility degree; and generating, by the computer processor, an output comprising the set of bounding boxes (i) respectively positioned at the set of positions and (ii) indicating, for each glyph of the set of glyphs, the legibility degree.

In another embodiment, a system for assessing text legibility in an electronic document comprising a background layer and a text layer is provided. The system may include: a memory storing a set of computer-readable instructions, and a processor interfacing with the memory. The processor may be configured to execute the set of computer-readable instructions to cause the processor to: generate, from the text layer of the electronic document, a text mask indicating textual or graphical content included in the text layer, the text mask comprising a set of glyphs respectively at a set of positions in the text layer, generate, from the text mask, a set of bounding boxes for the set of glyphs, the set of bounding boxes respectively positioned at the set of positions of the set of glyphs, analyze the text mask to assess, for each glyph of the set of glyphs, a legibility degree, and generate an output comprising the set of bounding boxes (i) respectively positioned at the set of positions and (ii) indicating, for each glyph of the set of glyphs, the legibility degree.

In a further embodiment, a computer-implemented method of assessing text legibility in an electronic document comprising a background layer and a text layer is provided. The computer-implemented method may include: generating, by a computer processor, a gradient of the background layer of the electronic document; generating, by the computer processor from the text layer, a set of bounding boxes for a set of glyphs respectively at a set of positions in the text layer; overlaying, by the computer processor, the set of bounding boxes on the gradient of the background layer; analyzing, by the computer processor, the set of bounding boxes overlaid on the gradient of the background layer to assess, for each bounding box of the set of bounding boxes, a background gradient value; and generating, by the computer processor, an output comprising the set of bounding boxes (i) respectively positioned at the set of positions of the set of glyphs and (ii) indicating, for each bounding box of the set of bounding boxes, the background gradient value.

BRIEF DESCRIPTION OF THE FIGURES

The patent or application file contains at least one drawing executed in color. Copies of this patent or patent application publication with color drawing(s) will be provided by the Office upon request and payment of the necessary fee.

DETAILED DESCRIPTION

The present embodiments may relate to, inter alia, platforms and technologies for assessing text legibility. Generally, a given electronic document may include non-textual background or visual content, as well as textual content that may be, at least in part, overlaid on the non-textual content. Certain characteristics of the electronic document may affect the legibility of the textual content such as, for example, whether and how the textual content overlays the non-textual content, as well as characteristics of the textual content itself (e.g., contrast, color, font, size, format, etc.), among other characteristics.

According to certain aspects, systems and methods may employ various techniques for analyzing electronic documents to identify textual content and assess the legibility of the textual content. In particular, the systems and methods may initially detect textual content and determine individual glyphs that compose the textual content. The systems and methods may, in some implementations, determine the antialiasing degree of the text. In alternative or additional implementations, the systems and methods may detect interference between the textual content and features in the non-textual content (e.g., the background image or content). Further, in alternative or additional implementations, the systems and methods may compare the contrast levels for the glyphs compared to the same in a corresponding text mask.

According to alternative or additional embodiments, the systems and methods may employ various machine learning or artificial intelligence techniques to assess text legibility. The systems and methods may initially train one or more machine learning models using a set of training data, where the set of training data may indicate text legibility levels or degrees for corresponding text glyphs. The systems and methods may input, into a trained machine learning model, an electronic document and the trained machine learning model may output a graphic (or other form of output) that indicates the text legibility levels or degrees for corresponding text glyphs. It should be appreciated that, throughout the following description and claims, the terms "degree" and "level" may be used interchangeably.

The systems and methods offer numerous benefits. In particular, the systems and methods support the accurate and efficient assessment of the legibility of text included in documents. By employing one or more different techniques, the systems and methods may offer improved accuracy in assessing text legibility. Additionally, the systems and methods support machine learning and artificial intelligence techniques which may reduce the time, effort, and amount of resources needed to analyze electronic documents, while also improving accuracy of the text legibility assessment. It should be appreciated that additional benefits are envisioned.

Figure 1A:
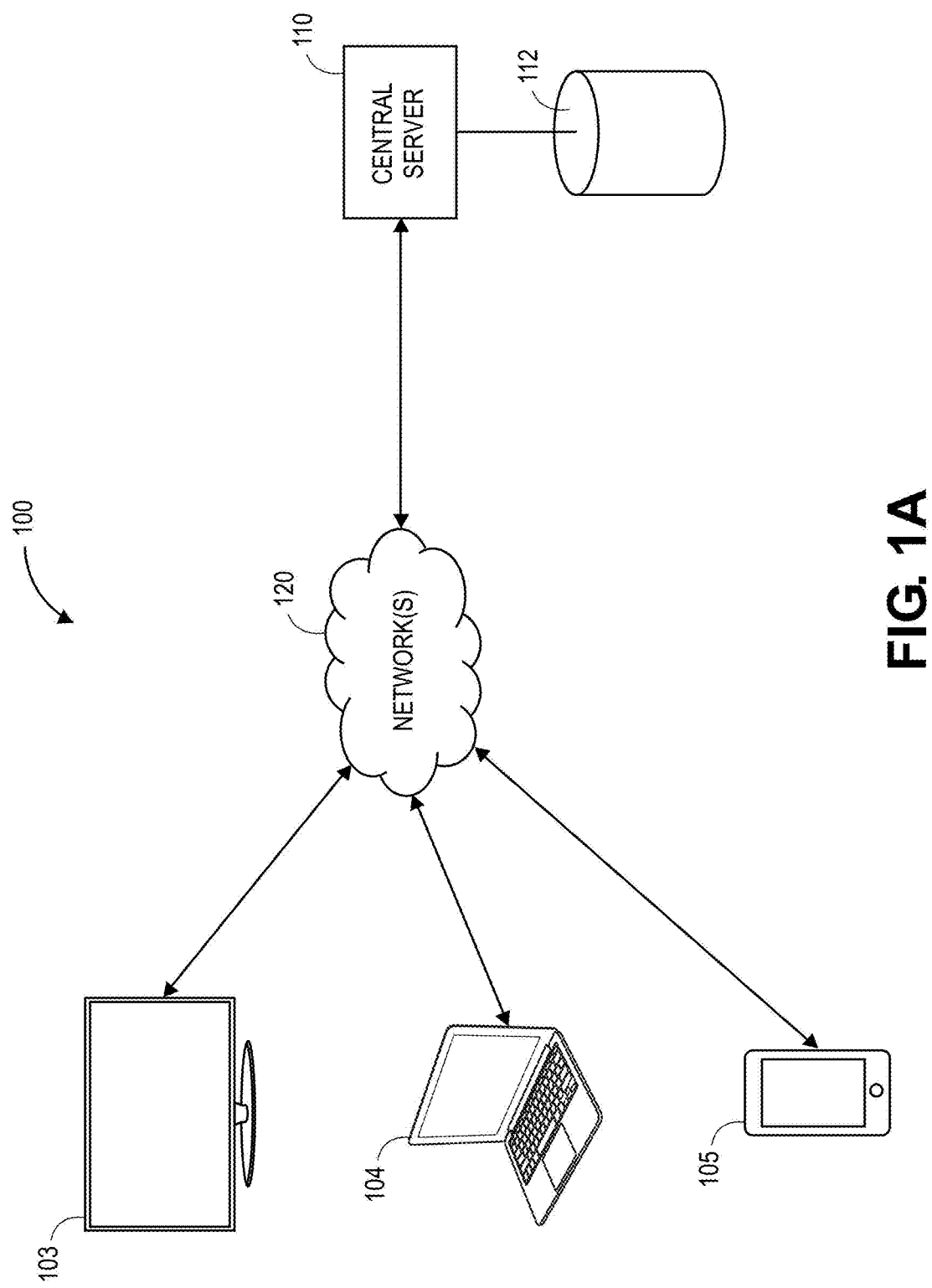
FIG. 1A depicts an overview of components and entities associated with the systems and methods, in accordance with some embodiments.

FIG. 1A illustrates an overview of a system 100 of components configured to facilitate the systems and methods. It should be appreciated that the system 100 is merely an example and that alternative or additional components are envisioned.

As illustrated in FIG. 1A, the system 100 may include a set of electronic devices 103, 104, 105 which may be used or operated by a set of users, such as any individual or person who may be interested in purchasing items, objects, products, and/or services that may be offered for sale by an entity. In an embodiment, the entity may be a corporation, company, partnership, retailer, wholesaler operating on behalf of another entity (e.g., a white label wholesaler), or the like, where the entity may offer an e-commerce platform (e.g., a website accessible by or an application executable by the electronic devices 103, 104 105) and optionally a set of brick-and-mortal retail stores. Each of the electronic devices 103, 104, 105 may be any type of electronic device such as a mobile device (e.g., a smartphone), desktop computer, notebook computer, tablet, phablet, GPS (Global Positioning System) or GPS-enabled device, smart watch, smart glasses, smart bracelet, wearable electronic, PDA (personal digital assistant), pager, computing device configured for wireless communication, and/or the like.

The electronic devices 103, 104, 105 may communicate with a central server 110 via one or more networks 120. The central server 110 may be associated with the entity that owns and/or manages the e-commerce platform(s) and/or the set of brick-and-mortal retail stores. In particular, the central server 110 may include or support a web server configured to host a website that offers various items/products for design and/or purchase by users. Further, the central server 110 may support a software application executable by the set of electronic devices 103, 104, 105 (i.e., the set of electronic devices 103, 104, 105 may interface with the central server 110 in executing the software application). In embodiments, the network(s) 120 may support any type of data communication via any standard or technology (e.g., GSM, CDMA, TDMA, WCDMA, LTE, EDGE, OFDM, GPRS, EV-DO, UWB, Internet, IEEE 802 including Ethernet, WiMAX, Wi-Fi, Bluetooth, and others).

Although depicted as a single central server 110 in FIG. 1A, it should be appreciated that the server 110 may be in the form of a distributed cluster of computers, servers, machines, or the like. In this implementation, the entity may utilize the distributed server(s) 110 as part of an on-demand cloud computing platform. Accordingly, when the electronic devices 103, 104, 105 interface with the server 110, the electronic devices 103, 104, 105 may actually interface with one or more of a number of distributed computers, servers, machines, or the like, to facilitate the described functionalities.

The central server 110 may be configured to interface with or support a memory or storage 112 capable of storing various data, such as in one or more databases or other forms of storage. According to embodiments, the storage 112 may store data or information associated with items or services that are offered for sale by the entity that owns and/or manages the e-commerce platform and/or the set of brick-and-mortar retail stores. For example, the storage 112 may store information associated with office supplies such as business cards and notepads, wellness items such as face masks, and/or the like, including information associated with a customer or client (e.g., company name and logo). For further example, the storage 112 may store templates of designs, as well as information associated with the designs, including properties and dimensions of the elements/components of the designs. Additionally, the storage 112 may store data associated with one or more machine learning models, training data associated therewith, and/or similar data.

Although three (3) electronic devices 103, 104, 105, and one (1) server 110 are depicted in FIG. 1A, it should be appreciated that greater or fewer amounts are envisioned. For example, there may be multiple central servers, each one associated with a different entity. Additionally, the electronic devices 103, 104, 105 and the central server 110 may interface with one or more separate, third-party servers or data sources (not depicted in FIG. 1A) to retrieve relevant data and information.

According to embodiments, users of the electronic devices 103, 104, 105 may create or upload a design embodied as an electronic document. The electronic devices 103, 104, 105 may enable the users to add, remove, and/or modify visual and/or textual content of the design, such as in contemplation of placing an order for an item (e.g., a business card) with the design incorporated therein. The design may be in the form of at least one digital image in various file formats (e.g., JPEG, TIFF, GIF, PNG, Raw, etc.), where the digital image(s) may depict visual content (i.e., the design itself) that may be composed of one or more design elements (e.g., backgrounds, logos, colors, etc.). According to embodiments, the digital image(s) may include textual content (i.e., alphanumeric text). Further, the users may use the electronic devices 103, 104, 105 to add textual content to the design, where the textual content may be (or may not be) at least partially overlaid on the digital image(s).

Figure 1B:
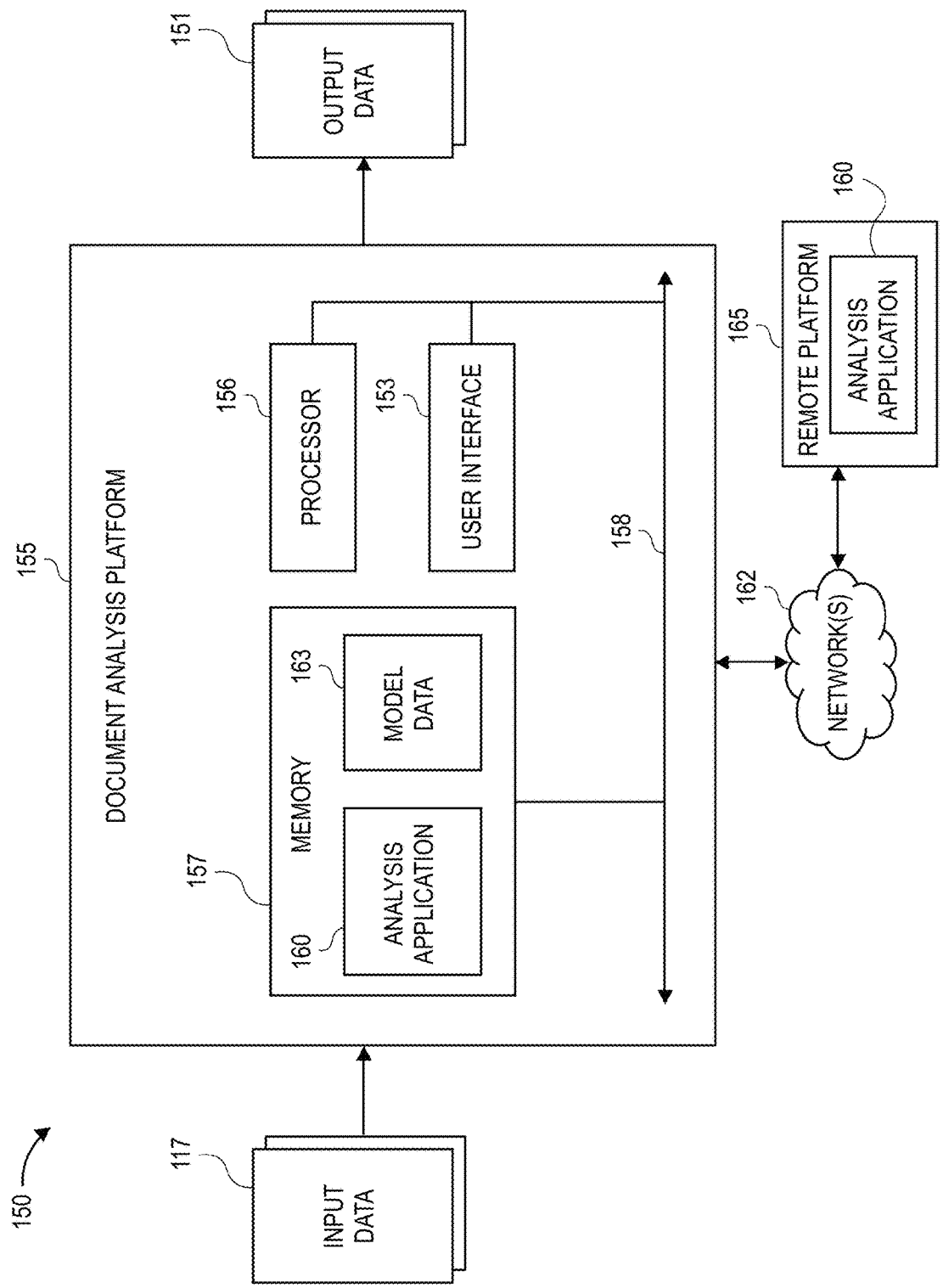
FIG. 1B depicts an overview of certain components configured to facilitate the systems and methods, in accordance with some embodiments.

The electronic devices 103, 104, 105 and/or the central server 110 may facilitate or perform various image processing and analysis techniques on the desired design to assess the legibility of the textual content relative to the visual (i.e., non-textual) content. According to some embodiments, the electronic devices 103, 104, 105 and/or the central server 110 may use various machine learning techniques to assess the legibility of the textual content. A user of the electronic devices 103, 104, 105 and/or the central server 110 may review a result(s) of the techniques to assess whether design modifications are warranted or desired, and facilitate the modifications accordingly. The electronic devices 103, 104, 105 may enable the users to place an order for an item with a design, modified or unmodified, applied thereto. FIG. 1B depicts more specific components associated with the systems and methods.

FIG. 1B an example environment 150 in which input data 117 is processed into output data 151 via a document analysis platform 155, according to embodiments. The document analysis platform 155 may be implemented on any computing device or combination of computing devices, including one or more of the electronic devices 103, 104, 105 or the central server 110 as discussed with respect to FIG. 1A. Components of the computing device may include, but are not limited to, a processing unit (e.g., processor(s) 156), a system memory (e.g., memory 157), and a system bus 158 that couples various system components including the memory 157 to the processor(s) 156. In some embodiments, the processor(s) 156 may include one or more parallel processing units capable of processing data in parallel with one another. The system bus 158 may be any of several types of bus structures including a memory bus or memory controller, a peripheral bus, or a local bus, and may use any suitable bus architecture. By way of example, and not limitation, such architectures include the Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

The document analysis platform 155 may further include a user interface 153 configured to present content (e.g., designs and components/elements thereof). Additionally, a user may review results of a design analysis and make selections to the presented content via the user interface 153, such as to modify designs (or design elements thereof) presented thereon. The user interface 153 may be embodied as part of a touchscreen configured to sense touch interactions and gestures by the user. Although not shown, other system components communicatively coupled to the system bus 158 may include input devices such as cursor control device (e.g., a mouse, trackball, touch pad, etc.) and keyboard (not shown). A monitor or other type of display device may also be connected to the system bus 158 via an interface, such as a video interface. In addition to the monitor, computers may also include other peripheral output devices such as a printer, which may be connected through an output peripheral interface (not shown).

The memory 157 may include a variety of computer-readable media. Computer-readable media may be any available media that can be accessed by the computing device and may include both volatile and nonvolatile media, and both removable and non-removable media. By way of non-limiting example, computer-readable media may comprise computer storage media, which may include volatile and nonvolatile, removable and non-removable media implemented in any method or technology for storage of information such as computer-readable instructions, routines, applications (e.g., an analysis application 160) data structures, program modules or other data. Computer storage media may include, but is not limited to, RAM, ROM, EEPROM, FLASH memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the processor 156 of the computing device.

The document analysis platform 155 may operate in a networked environment and communicate with one or more remote platforms, such as a remote platform 165, via a network 162, such as a local area network (LAN), a wide area network (WAN), or other suitable network. The platform 165 may be implemented on any computing device, including one or more of the electronic devices 103, 104, 105 or the server 110 as discussed with respect to FIG. 1A, and may include many or all of the elements described above with respect to the platform 155. In some embodiments, as will be described herein, the analysis application 160 as will be further described herein may be stored and executed by the remote platform 165 instead of by or in addition to the platform 155.

Generally, each of the input data 117 and the output data 152 may be embodied as any type of electronic document, file, template, etc., that may include various graphical/visual and/or textual content, and may be stored in memory as program data in a hard disk drive, magnetic disk and/or optical disk drive in the document analysis platform 155 and/or the remote platform 165. The document analysis platform 155 may support one or more techniques, algorithms, or the like for analyzing the input data 117 to generate the output data 151. In particular, the analysis application 160 may analyze an electronic document included in the input data 117 to assess a legibility degree or level of the textual content included in the electronic document. Based on the analysis, the analysis application 160 may output an electronic document or other type of graphical design (i.e., the output data 151) which may visually indicate the legibility degree or level of the textual content.

The document analysis platform 155 may support and facilitate various techniques for assessing text legibility. In an implementation, the document analysis platform 155 may analyze the input electronic document to detect antialiasing degrees of the textual content included in the input electronic document. In an additional or alternative implementation, the document analysis platform 155 may analyze the input electronic document to detect interference between text and various features in background content. In an additional or alternative implementation, the document analysis platform 155 may calculate contrast levels between characters or glyphs in a combination of graphical and textual content as compared to a contrast level of a text mask of the textual content. The memory 157 may store the output data 151 and other data that the document analysis platform 155 generates or uses in associated with the analysis of the input data 117.

According to embodiments, the analysis application 160 may employ machine learning and artificial intelligence techniques such as, for example, a regression analysis (e.g., a logistic regression, linear regression, random forest regression, probit regression, or polynomial regression), classification analysis, k-nearest neighbors, decisions trees, random forests, boosting, neural networks, support vector machines, deep learning, reinforcement learning, Bayesian networks, or the like. When the input data 117 is a training dataset, the analysis application 160 may analyze/process the input data 117 to generate a machine learning model(s) for storage as part of model data 163 that may be stored in the memory 157.

When the input data 117 comprises an electronic document to be analyzed using the machine learning model, the document analysis application 160 may analyze or process the input data 117 using the machine learning model to generate the output data 151 that may comprise various information that indicates a legibility of the textual content included in the input data 117. In embodiments, various of the output data 151 may be added to the machine learning model stored as part of the model data 163. In analyzing or processing the input data 117, the document analysis application 160 may use any of the output data 151 previously generated by the document analysis platform 155.

The analysis application 160 (or another component) may cause the output data 151 (and, in some cases, the training or input data 117) to be displayed on the user interface 153 for review by the user of the document analysis platform 155. The user may select to review and/or modify the displayed data. For instance, the user may review the output data 152 to assess results of the document analysis, modify any portions of the designs, and/or facilitate other functionalities.

In general, a computer program product in accordance with an embodiment may include a computer usable storage medium (e.g., standard random access memory (RAM), an optical disc, a universal serial bus (USB) drive, or the like) having computer-readable program code embodied therein, wherein the computer-readable program code may be adapted to be executed by the processor 156 (e.g., working in connection with an operating systems) to facilitate the functions as described herein. In this regard, the program code may be implemented in any desired language, and may be implemented as machine code, assembly code, byte code, interpretable source code or the like (e.g., via Golang, Python, Scala, C, C++, Java, Actionscript, Objective-C, Javascript, CSS, XML, R, Stata, AI libraries). In some embodiments, the computer program product may be part of a cloud network of resources.

FIGS. 2A-2E illustrate various example graphical components and elements associated with the systems and methods. The components and elements as illustrated in FIGS. 2A-2E may be derived from one or more electronic documents, and an electronic device (such as any of the electronic devices 103, 104, 105 and/or the central server 110 as discussed with respect to FIG. 1A) may generate the components and elements. It should be appreciated that FIGS. 2A-2E are merely exemplary and illustrative, and that different components and elements are envisioned.

Figure 2B:
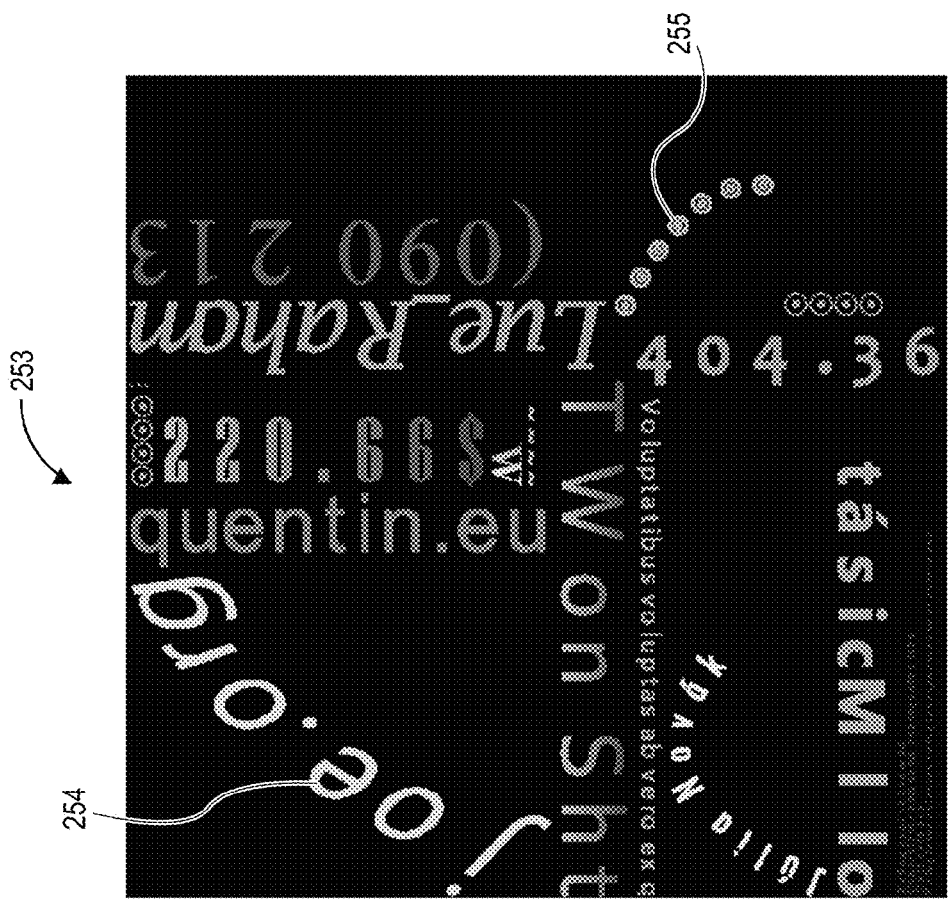
FIGS. 2A-2E illustrate various graphical components and elements associated with the systems and methods, in accordance with some embodiments.
Figure 2A:
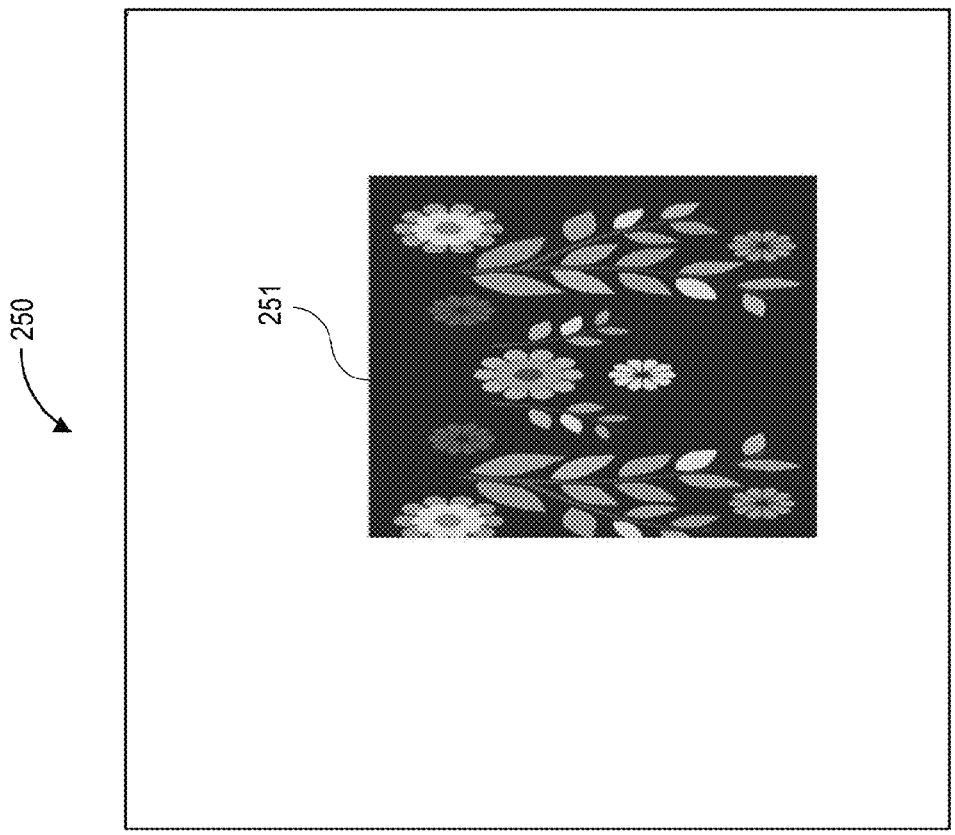

FIG. 2A illustrates a background layer 250 of an electronic document, where the background layer 250 may include a graphic 251 that includes various visual content. According to embodiments, the graphic 251 may occupy a portion(s) or all of the area of the background layer 250 (as shown in FIG. 2A, the graphic 251 occupies a center portion of the background layer 250).

FIG. 2B illustrates a text and graphics layer 253 of the electronic document, where the text and graphics layer 253 may include any text or text character present in the electronic document. Generally, a text and graphics layer may be referred to herein as a "text layer," and any text or text character may be referred to herein as a "glyph." It should be appreciated that a graphical character or element (i.e., a non-textual character) may not be considered a glyph. For example, an "e" character 254 may be a glyph and a dotted circle character 255 may not be a glyph.

Figure 2D:
Figure 2C:
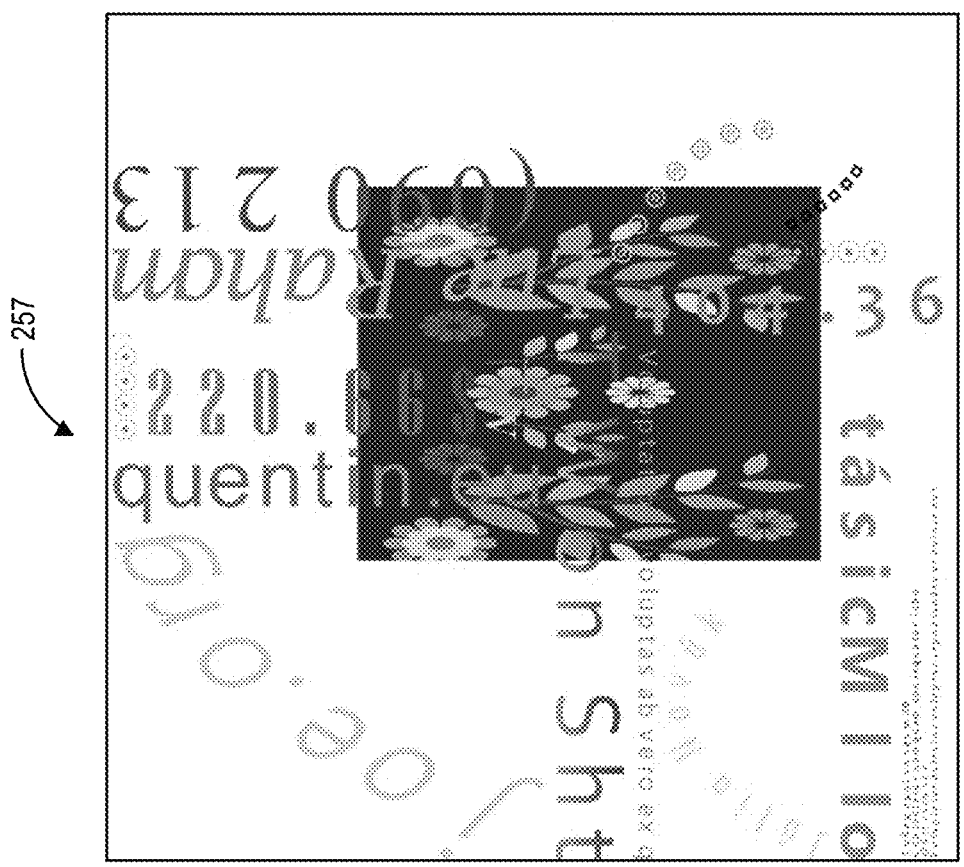

FIG. 2C illustrates a combined layer 257 that may consist of the background layer 250 overlaid on the text and graphics layer 253 (or vice-versa). According to embodiments, the background layer 250 and the text and graphics layer 253 may have the same dimensions so that the layers 250, 253 align in the combined layer 257.

FIG. 2D illustrates a text mask 259. According to embodiments, an electronic device may generate the text mask 259 based on the text and graphics layer 253, where the text mask 259 may account for any presence of any glyph. Accordingly, the text mask 259 may account for any text or text character in the text and graphics layer 253, and not account for any graphical character or element in the text and graphics layer 253. For example, the text mask 259 includes an "e" glyph 260 that corresponds to the "e" glyph 254 in FIG. 2B, and the text mask 259 does not have a glyph corresponding to the dotted circle character 255 of FIG. 2B. Further, in embodiments, the text mask 259 may be in greyscale using a single shade. Therefore, even though there may be glyphs in the text and graphics layer 253 that are "lighter" than other glyphs (e.g., due to differences in color and/or shading), these glyphs will have the same shade as the other glyphs in the text mask 259.

Figure 2E:
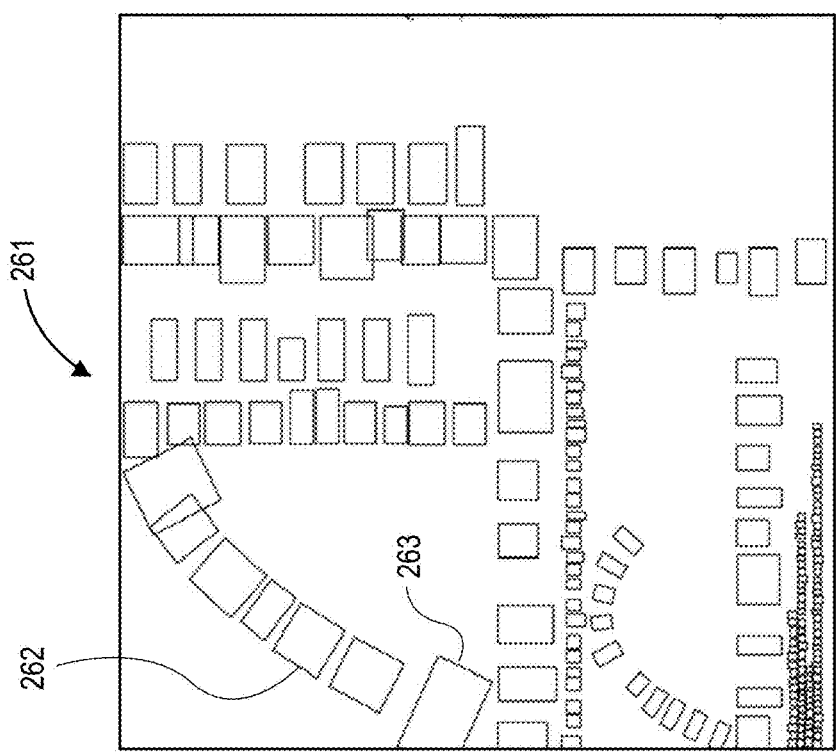

FIG. 2E illustrates a set of bounding boxes 261 corresponding to the set of glyphs in the text mask 259. For example, a bounding box 262 corresponds to the "e" glyph 260 of FIG. 2D. According to embodiments, an electronic device may generate the set of bounding boxes 261 based on a size and shape of the corresponding set of glyphs (i.e., so that each bounding box may be a "boundary" of the corresponding glyph). For example, the bounding box 262 may be smaller than a bounding box 263 because the glyph corresponding to the bounding box 262 is smaller than the glyph corresponding to the bounding box 263. Although illustrated as a set of rectangles in FIG. 2E, the set of bounding boxes 261 may be other shapes and combination of shapes.

Figures 3A, 3B, 3C:
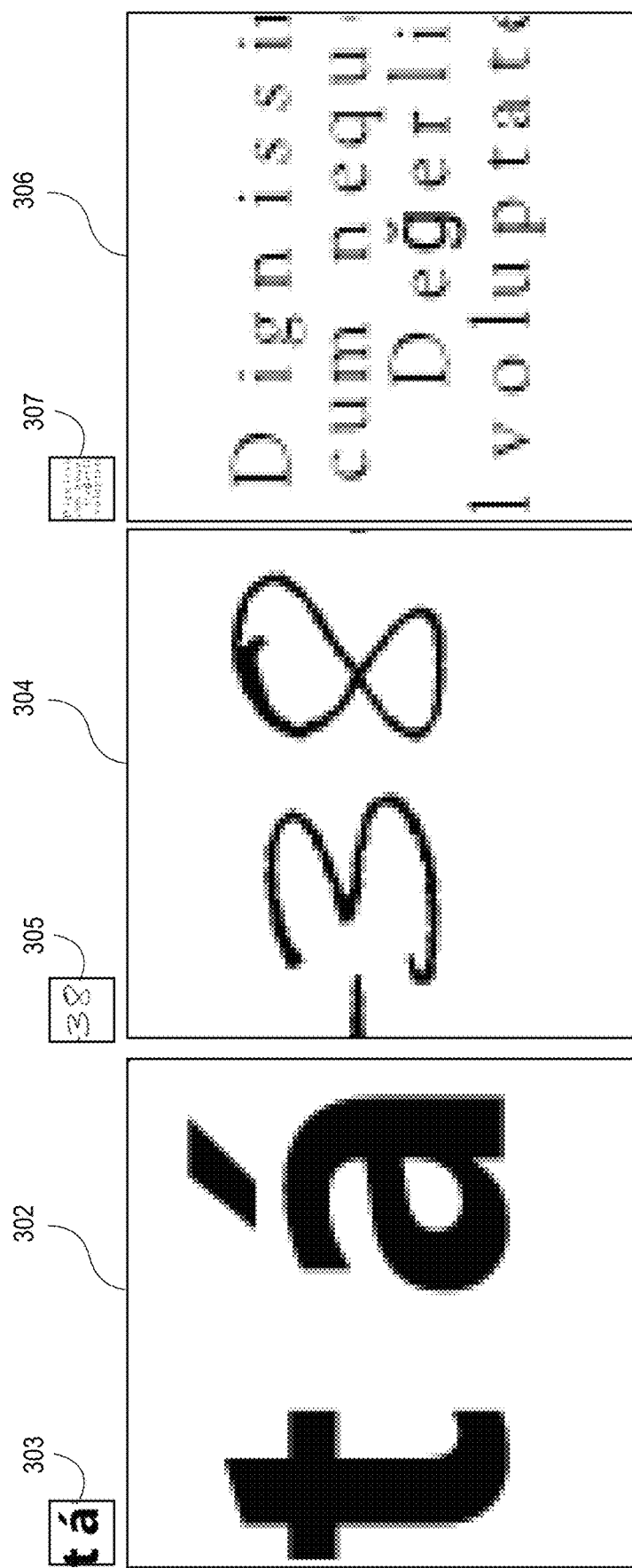
FIGS. 3A-3C illustrate varying degrees of antialiasing in example text, in accordance with some embodiments.

FIGS. 3A-3C illustrate varying degrees of antialiasing in example text. In an implementation, the systems and methods may determine text legibility through measuring the antialiasing degree in the text. As understood, the antialiasing degree of text is a function of a ratio of antialiased (i.e., gray) pixel count to the total non-white pixel count that is calculated using a text mask within a bounding box for each glyph. Generally, the antialiasing degree is useful for detecting small, thin, and/or intricate text as the calculated degree is higher for glyphs exhibiting those characteristics.

FIG. 3A depicts text (actual size 303 and zoomed in 302) with a relatively low antialiasing degree; FIG. 3B depicts text (actual size 305 and zoomed in 304) with a medium antialiasing degree; and FIG. 3C depicts text (actual size 307 and zoomed in 306) with a relatively high antialiasing degree. As illustrated in FIGS. 3A-3C, the smaller, thinner, and/or more intricate the text, the higher the antialiasing degree of the text.

Figure 4A:
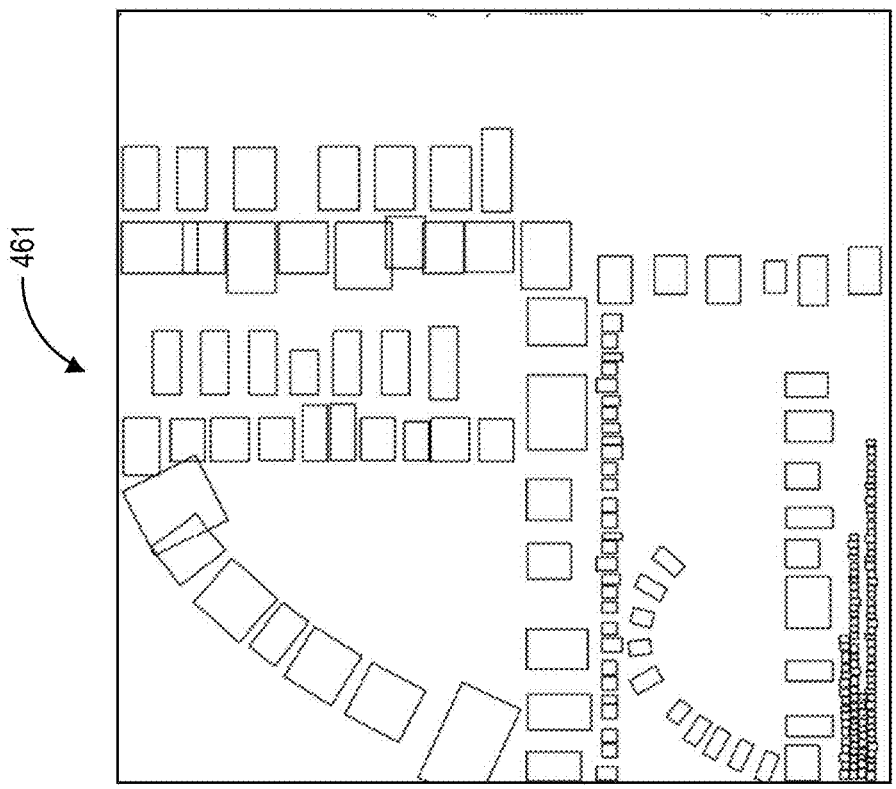
FIGS. 4A-4C depict example inputs and outputs associated with assessing text legibility using antialiasing degree, in accordance with some embodiments.
Figure 4B:
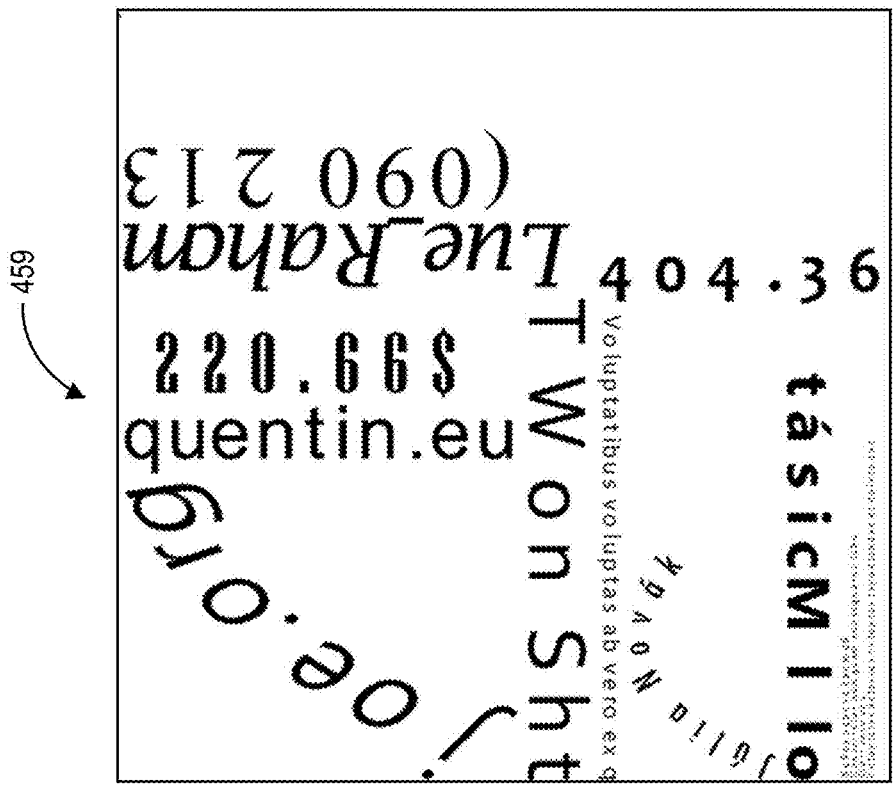
Figure 4C:
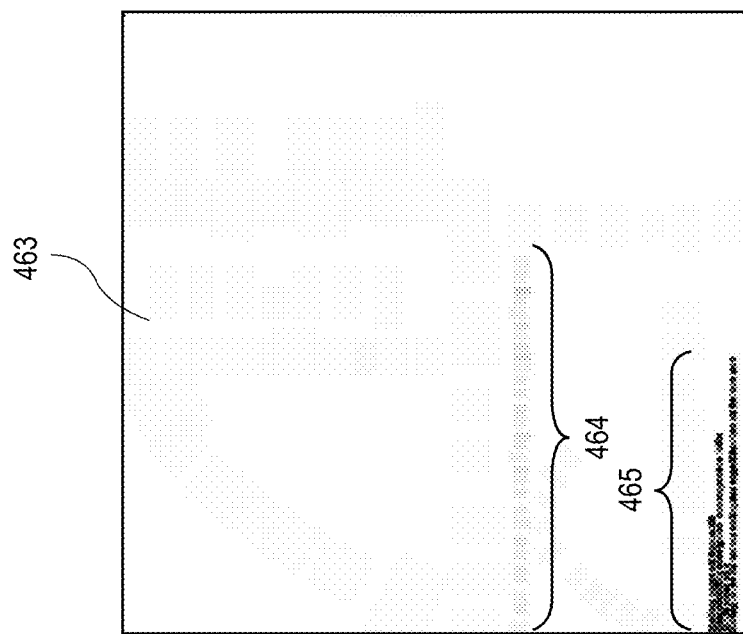

FIGS. 4A-4C depict example inputs and outputs associated with assessing text legibility using antialiasing degree. FIGS. 4A and 4B depict respective inputs: FIG. 4A depicts a text mask 459 (which corresponds to the text mask 259 as discussed with respect to FIG. 2D) and FIG. 4B depicts a set of bounding boxes 461 (which corresponds to the set of bounding boxes 261 as discussed with respect to FIG. 2E).

The electronic device may analyze the inputs (namely, the text mask 459 and the set of bounding boxes 461) and, for each depicted glyph, calculate the antialiasing degree. Based on the analysis, the electronic device may generate an output map 463, as depicted in FIG. 4C. In the output map 463, each bounding box is represented as a shade of gray (e.g., ranging from 0% to 100%), where the darker the bounding box, the higher the antialiasing degree. Accordingly, because antialiasing degree may indicate a degree of text legibility, the darker the bounding box in the output map 463, the less legible the corresponding glyph as measured by the antialiasing degree of the corresponding glyph. For example, two sets of shaded bounding boxes 464, 465 correspond to two sets of glyphs that are less legible than other glyphs.

FIGS. 5A-5E depict example inputs and outputs associated with assessing text legibility by detecting interference between text and features in a corresponding background image.

Figure 5A:
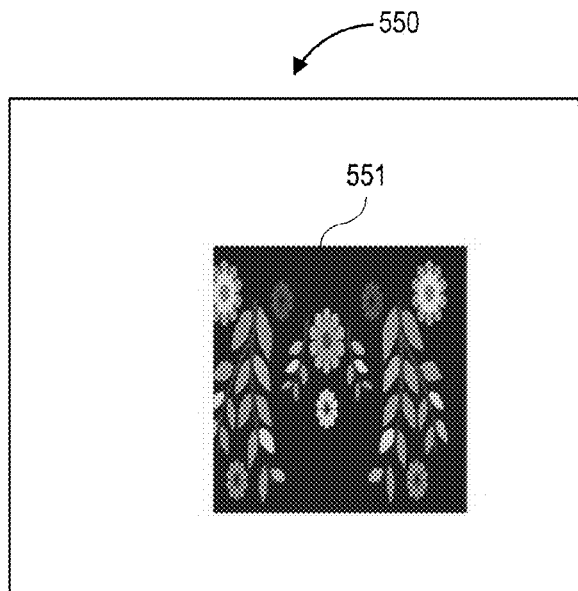
FIGS. 5A-5E depict example inputs and outputs associated with assessing text legibility by detecting interference between text and features in a corresponding background image, in accordance with some embodiments.
Figure 5B:
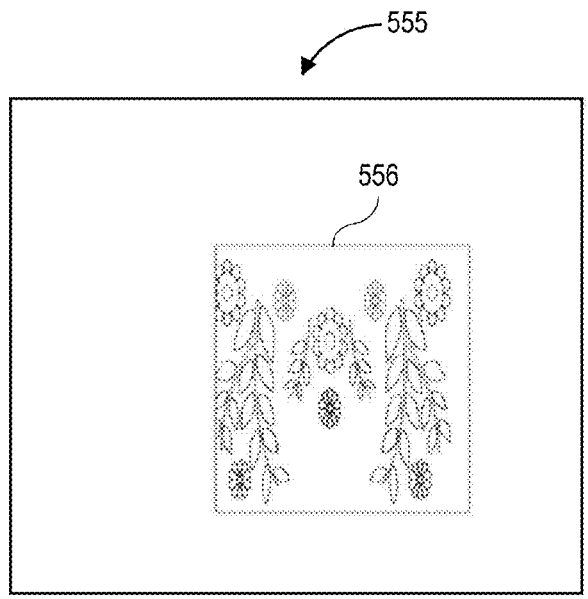

FIG. 5A depicts a background layer 550 of an electronic document, where the background layer 550 may include a graphic 551 that includes various visual content. The electronic device may generate, based on the background layer 550, an image gradient (generally, "gradient") which may depict features of the graphic 551. FIG. 2B depicts a gradient layer 555 which includes a gradient 556 corresponding to the graphic 551 of the background layer 550. According to embodiments, the electronic device may convert the background layer 550 into a color space prior to generating or calculating the gradient.

Figure 5C:
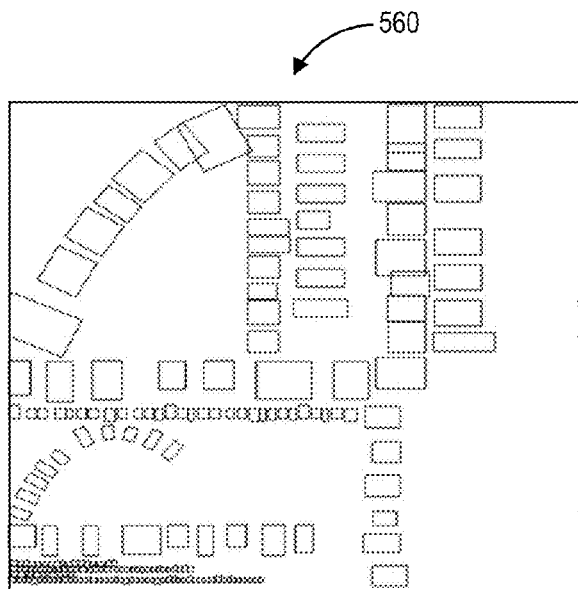
Figure 5D:
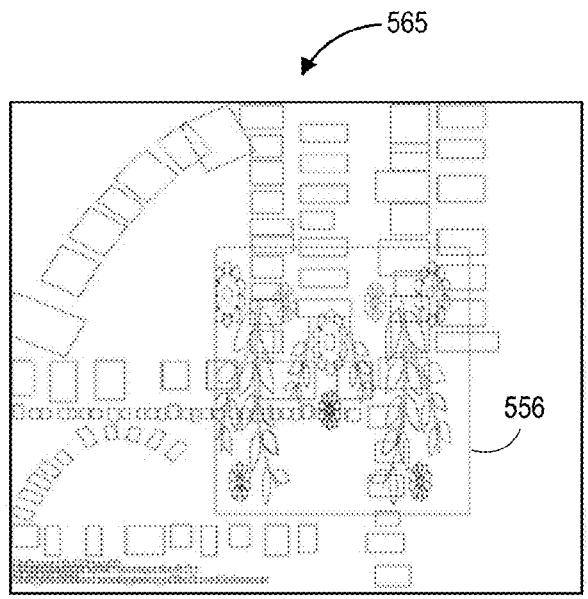

FIG. 5C depicts a set of bounding boxes 560 corresponding to a set of glyphs in a text mask. As illustrated, the set of bounding boxes 560 is the same as the set of bounding boxes 261 corresponding to the set of glyphs in the text mask 259, as illustrated in FIG. 2E. FIG. 5D depicts a layer 565 consisting of the set of bounding boxes 261 of FIG. 5C overlaid on the gradient 556 of the gradient layer 555 of FIG. 5B. Accordingly, there are certain of the set of bounding boxes 261 that overlap with corresponding portions of the gradient 556. According to embodiments, the electronic device may determine, for each of the set of bounding boxes 261, a value of a portion of the gradient 556 within that bounding box, where the value may be any numerical representation of the corresponding portion of the gradient 556.

Figure 5E:
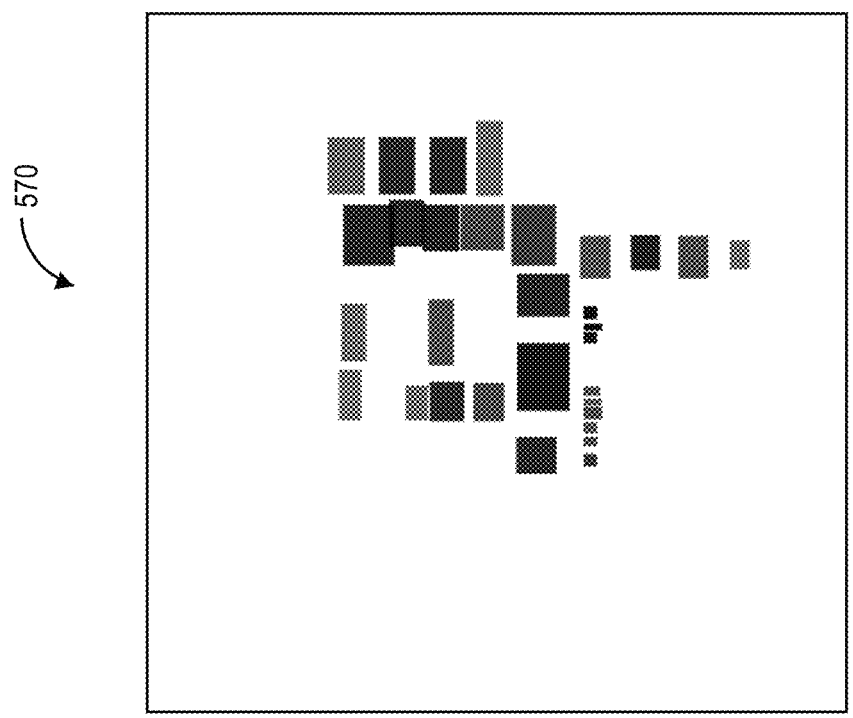

FIG. 5E depicts an output map 570 resulting from an analysis of the layer 565. In particular, the electronic device may calculate the maximum background gradient value for each bounding box in the set of bounding boxes 261. In the output map 570, each bounding box is represented as a shade of gray (e.g., ranging from 0% to 100%), where the darker the bounding box, the stronger or more apparent the background feature is present within that bounding box. Accordingly, because the strength of a background feature may indicate a degree of text legibility, the darker the bounding box in the output map 570, the less legible the corresponding glyph of the bounding box.

FIGS. 6A-6G depict inputs and outputs associated with assessing text legibility by determining contrast levels between text and background, and specifically calculating how much lower the contrast is for each glyph in combined artwork compared to the same in a text mask.

Figure 6A:
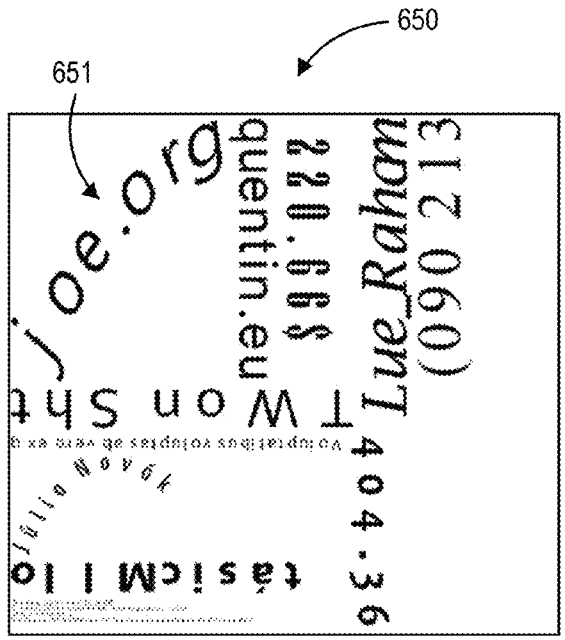
FIGS. 6A-6G depict example inputs and outputs associated with assessing text legibility by determining contrast levels between text and background, in accordance with some embodiments.

FIG. 6A illustrates a text mask 650 that may be generated from text included in a text layer, where the text mask 650 may account for any presence of any glyph. The electronic device may generate a gradient of the text mask 650, which is illustrated as a gradient 655 in FIG. 6B.

Figure 6B:
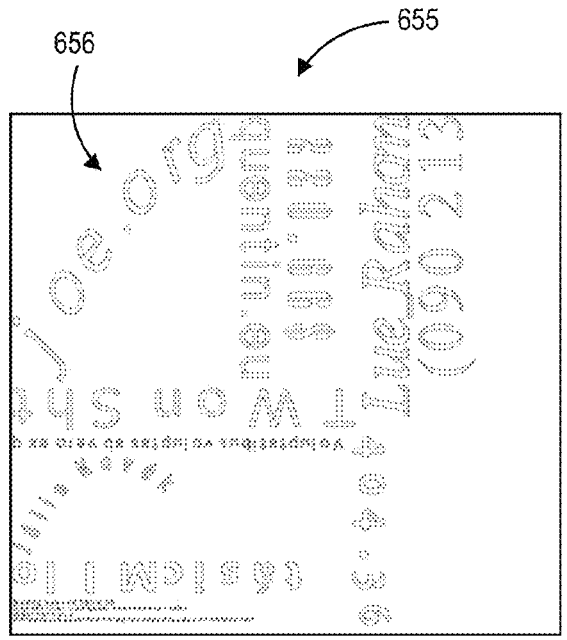
Figure 6C:
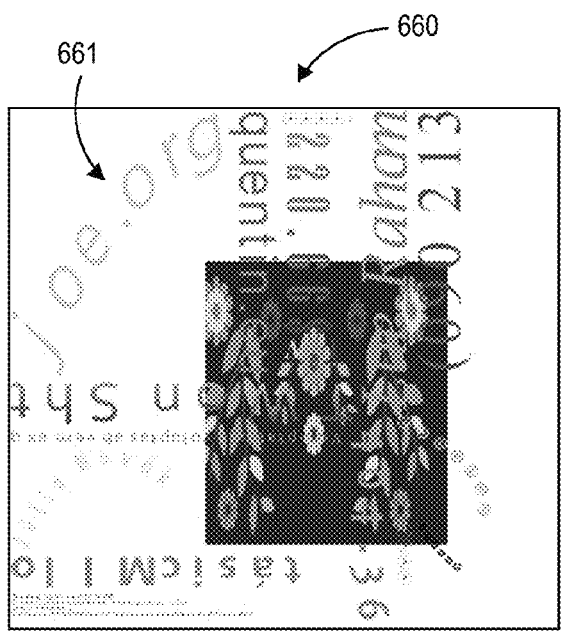
Figure 6D:
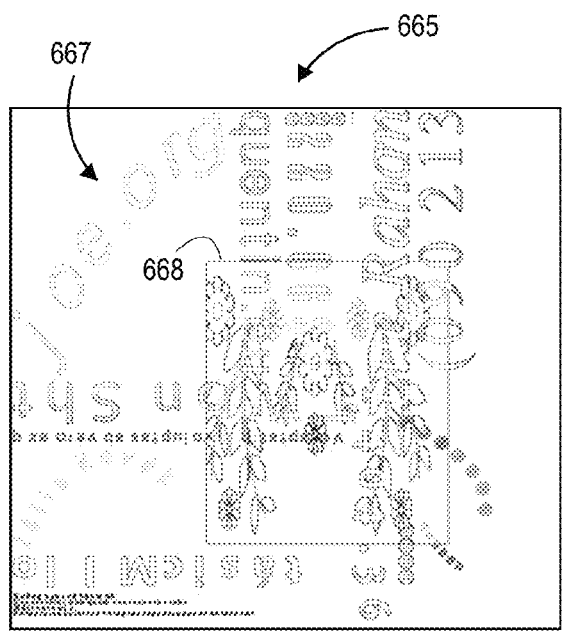

FIG. 6C illustrates a combined layer 660 that may consist of a background layer (in this case, the background layer 250 as discussed with respect to FIG. 2A) overlaid on a text and graphics layer (in this case, the text and graphics layer 253 as discussed with respect to FIG. 2B). Although not illustrated as such, it should be appreciated that the combined layer 660 may be in color so as to illustrate differences in color among the elements of the combined layer 660. The electronic device may generate a gradient 665 of the combined layer 660, as illustrated in FIG. 6D.

Because the combined layer 660 may be in color and because the text mask 650 may a consistent shade, the respective gradients 665 and 655 may illustrate gradient differences of the underlying elements. For example, the text "joe.org" 651 is present in the text mask 650, where a portion 656 of the gradient 655 corresponding to the "joe.org" text 651 is illustrated in FIG. 6B as uniform in contrast relative to the other portions of the gradient 655. In contrast, the text "joe.org" 661 in the combined layer 660 is a lighter shade relative to some of the other text in the combined layer 660. Accordingly, a portion 667 of the gradient 665 corresponding to the "joe.org" text 661 is illustrated in FIG. 6D as lighter in contrast to other portions of the gradient 665. As a result, the "joe.org" text 661 in the combined layer 660 of FIG. 6C may be less legible than the "joe.org" text 651 in the text mask 650 of FIG. 6A.

Figure 6F:
Figure 6E:
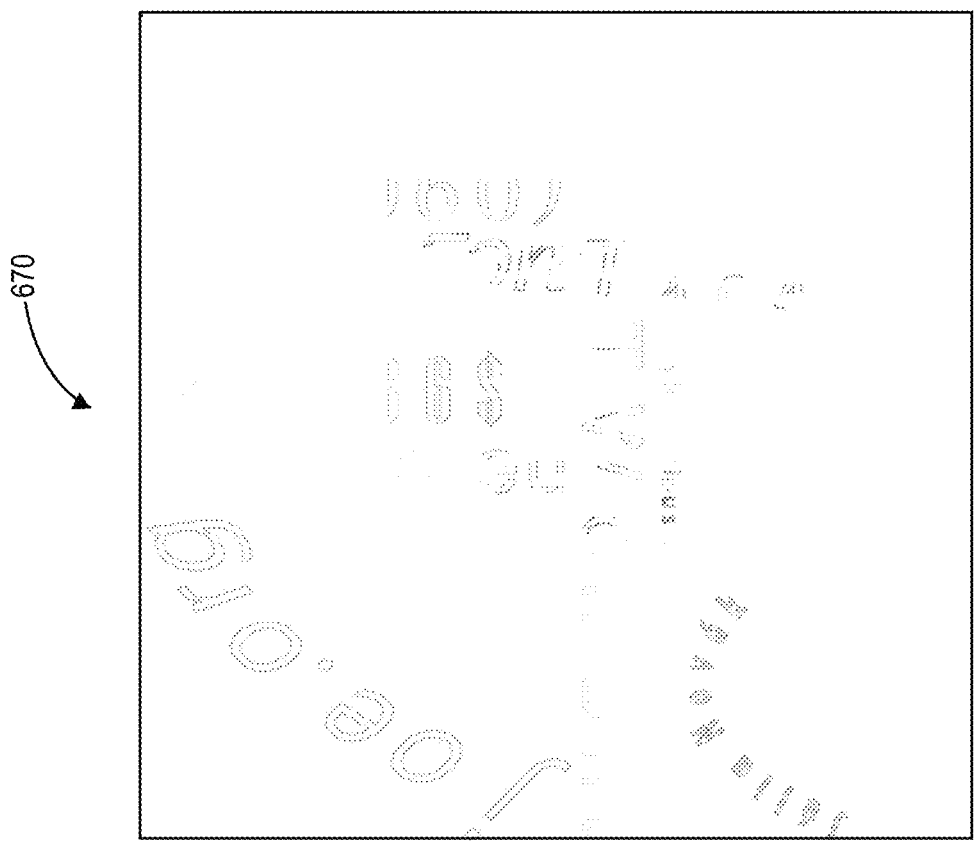

FIG. 6E illustrates a result 670 of a different between the gradient 655 and the gradient 665. In particular, the electronic device subtracts the gradient 665 from the gradient 655, where the electronic device removes any content that is present in the gradient 665 but is not present in the gradient 655. For example, a gradient portion 668 of the background image as illustrated in the gradient 665 FIG. 6D is not present in the gradient 655 of FIG. 6B, and is therefore not present in the result 670.

The result 670 thus illustrates text glyphs in the gradient 665 that are darker than (i.e., contrast more with) the corresponding text glyphs in the gradient 655. In embodiments, the remaining glyphs or portions thereof in the result 670 may correspond to glyphs or portions thereof that are lighter in contrast.

The electronic device may overlay the set of bounding boxes for the set of glyphs on the result 670, resulting in a bounding box result 675 as illustrated in FIG. 6F. The electronic device may use, as the set of bounding boxes, the set of bounding boxes 261 corresponding to the set of glyphs in the text mask 259, as illustrated in FIG. 2E. Thus, in the bounding box result 675 of FIG. 6F, the set of bounding boxes bounds at least a portion of the glyphs present in the original text mask 259.

Figure 6G:
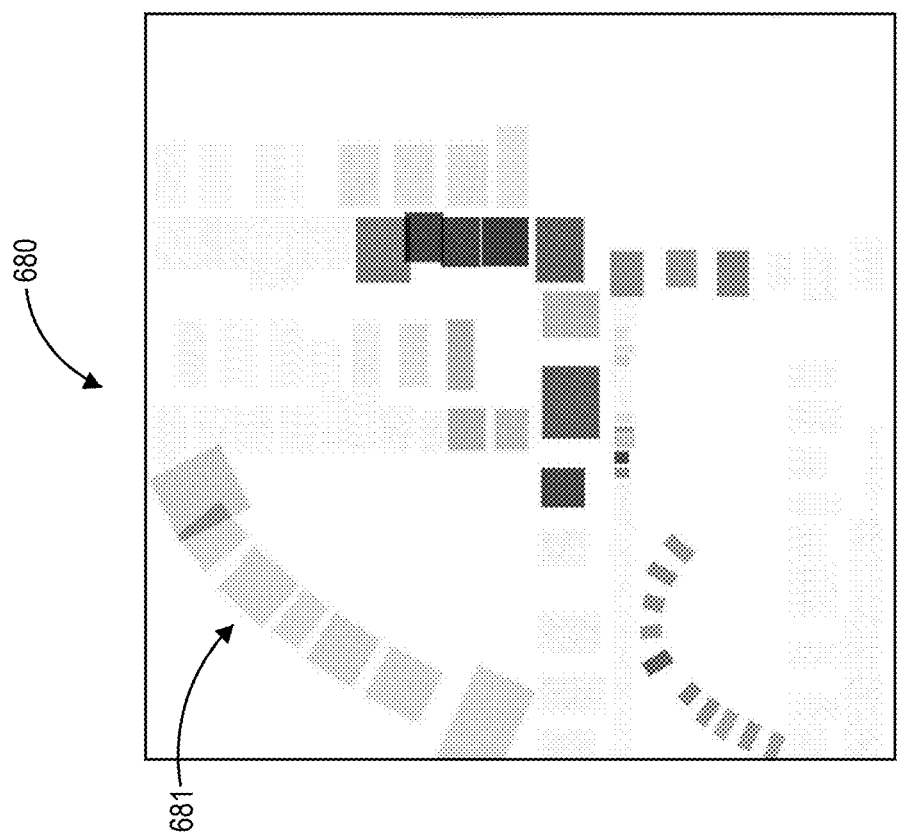

FIG. 6G depicts an output map 680 resulting from an analysis of the bounding box result 675 of FIG. 6F. In particular, the electronic device may calculate the maximum gradient value for each bounding box in the set of bounding boxes depicted in the bounding box result 675. In the output map 680, each bounding box is represented as a shade of gray (e.g., ranging from 0% to 100%), where the darker the bounding box, the stronger or more apparent the feature or element is present within that bounding box.

Accordingly, because the strength of a feature or element may indicate a degree of text legibility, the darker the bounding box in the output map 680, the less legible the corresponding feature or element in the bounding box. For example, the darkest bounding boxes in the output map 680 are clustered near where the text overlays the background image in the combined layer 660 of FIG. 6C. Additionally, a set of bounding box results 681 correspond to the text "joe.org" which has a lighter contrast in the combined layer 660 as compared to the text mask 650.

According to embodiments, the systems and methods may facilitate one or more of the techniques as described with respect to FIGS. 2A-2E, FIGS. 3A-3C, FIGS. 4A-4C, FIGS. 5A-5E, and FIGS. 6A-6G, to arrive at one or more outputs that indicate text legibility degrees or levels for the underlying text. Additionally or alternatively, the systems and methods may employ machine learning and/or artificial intelligence techniques in processing electronic documents to assess text legibility. The systems and methods may create a set of visual data using various combinations of the techniques as discussed herein, and train a neural network on the resulting data. In embodiments, the systems may employ various network architectures (e.g., a U-NET network architecture) to learn desired pixel-to-pixel data transformations.

The systems and methods may utilize "blobs" (i.e., non-linear) shapes for the glyphs instead of squares or rectangles because it may be easier for machine learning models to learn using smooth shapes. Additionally, the systems and methods may combine one or more of the processing and analysis techniques as described herein, into a single aggregated measure that may be normalized to values in [0 . . . 1] (i.e., a value indicative of text legibility).

Figure 7B:
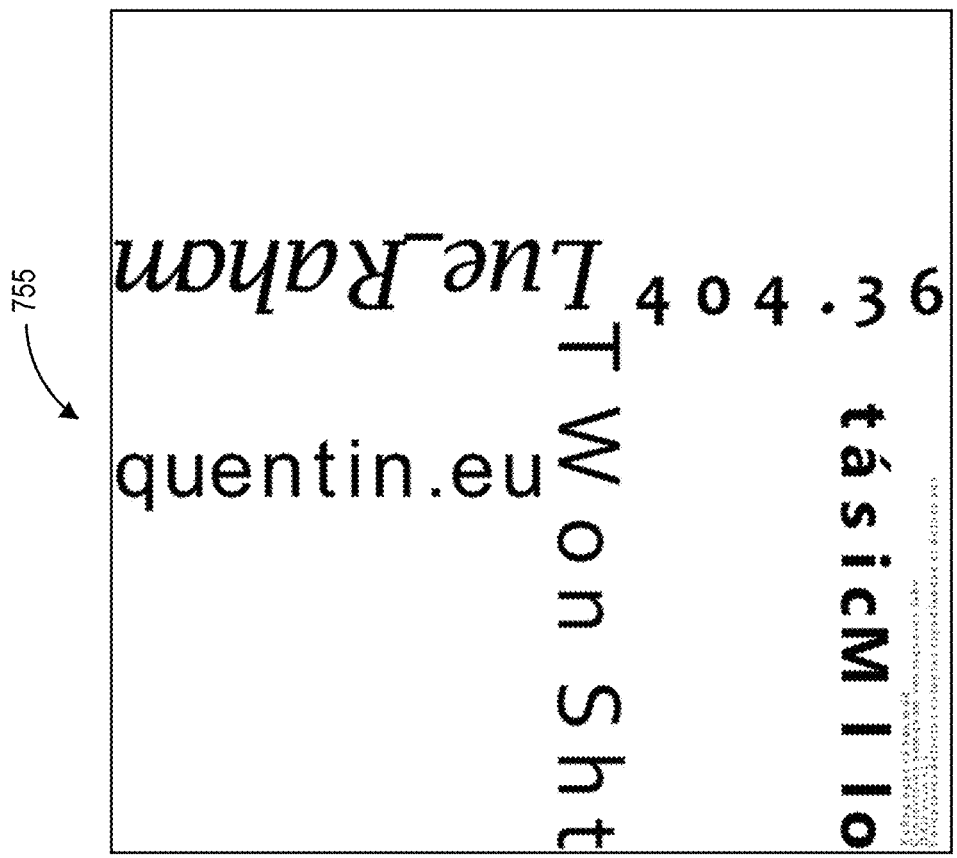
FIGS. 7A and 7B illustrate example inputs for training a machine learning model.
Figure 7A:
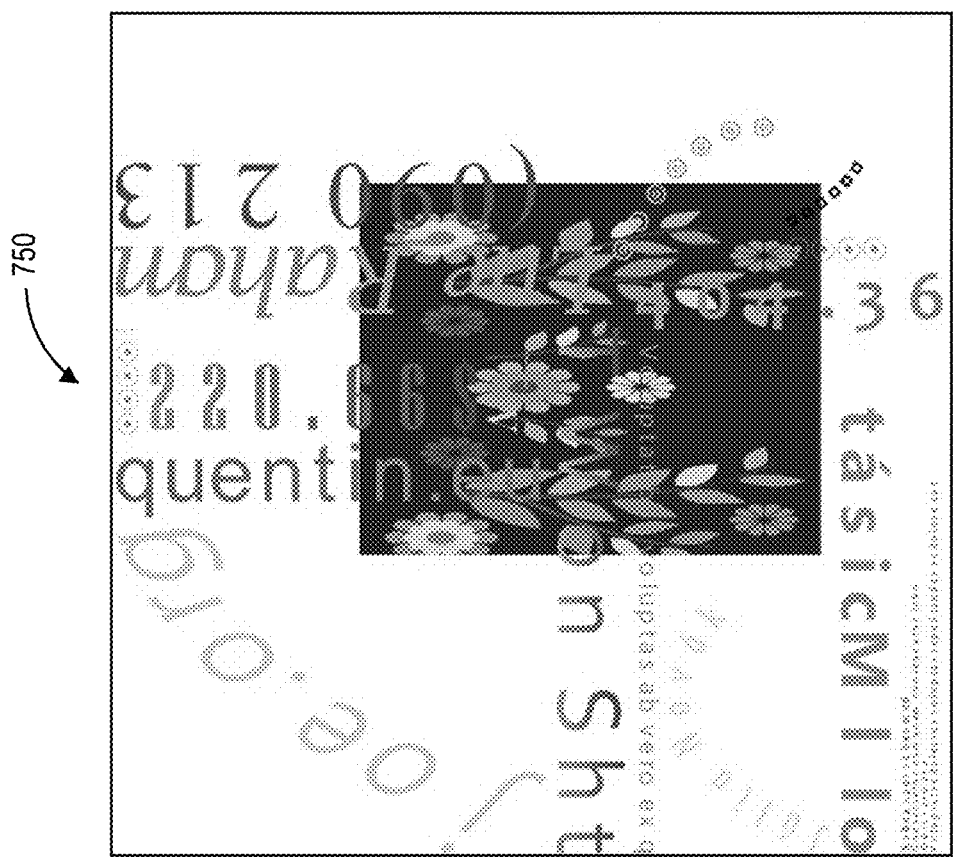

FIGS. 7A and 7B illustrate example inputs for training a machine learning model. In particular, FIG. 7A illustrates a combined layer 750 that may consist of a background layer overlaid on a text and graphics layer. Further, FIG. 7B illustrates a text mask 755 that may be a partial text mask (e.g., a partial version of the text mask 650 as discussed with respect to FIG. 6A). According to embodiments, the electronic device may generate the text mask 755 by removing at least a portion of the lines from a corresponding complete text mask, such as randomly or according to another technique.

It should be appreciated that the electronic device may train the machine learning model with a set of training data that includes the example inputs as depicted in FIGS. 7A and 7B, and additional training data. According to embodiments, the additional training data may include different electronic documents having different combinations of background and textual content, as well as portions of or entire text masks having different combinations of glyphs. Additionally, the set of training data may be labeled with a corresponding set of desired outputs. The set of training data may additionally or alternatively include any input or output data associated with the techniques as discussed with respect to FIGS. 2A-2E, FIGS. 3A-3C, FIGS. 4A-4C, FIGS. 5A-5E, and FIGS. 6A-6G.

Figure 8B:
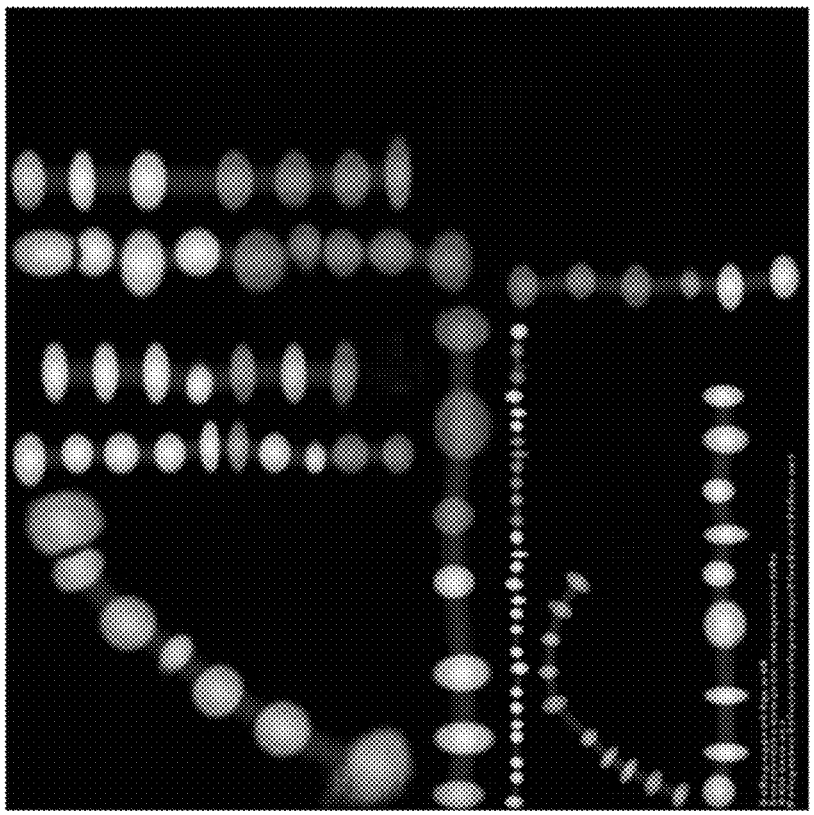
FIGS. 8A and 8B illustrate example outputs associated with a machine learning model, in accordance with some embodiments.
Figure 8A:
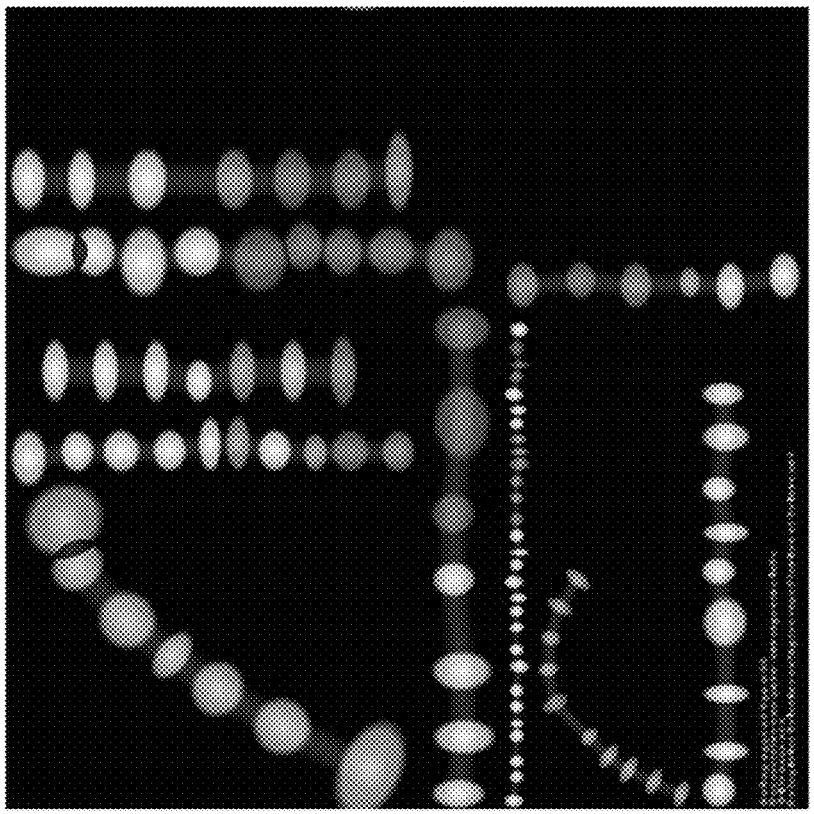

FIGS. 8A and 8B illustrate example outputs associated with the machine learning model. Generally, each output of the machine learning model may be encoded as a red-green-blue (RGB) image, where each RGB component may correspond to a particular characteristic of the associated input(s).

FIG. 8A illustrates an example desired output 850 for the machine learning model, where the desired output 850 may be part of the set of training data. That is, the desired output 850 may constitute a labeled portion of the input data that the electronic device uses to train the machine learning model.

FIG. 8B illustrates an example actual output 855 from the trained machine learning model. As illustrated in FIGS. 8A and 8B, the example desired output 850 is similar to the example actual output 855, indicating the output accuracy of the machine learning model.

Figure 9A:
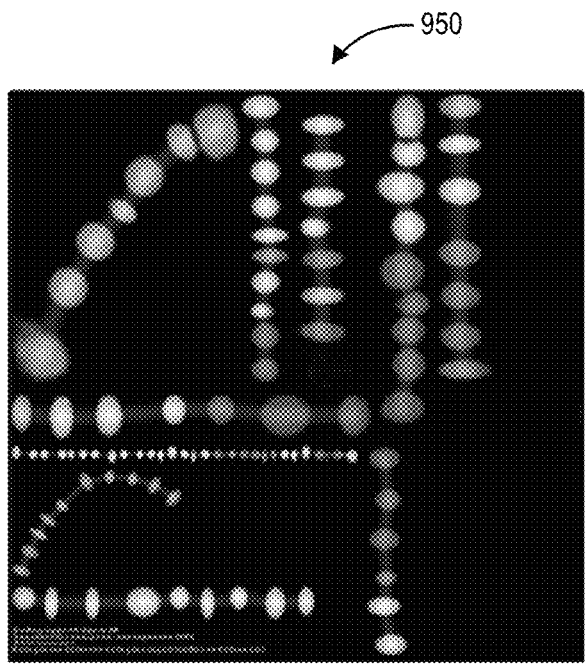
FIGS. 9A-9D illustrate an example output from the machine learning model and components thereof, in accordance with some embodiments.

FIGS. 9A-9D illustrate an example output from the machine learning model and components thereof. In particular, FIG. 9A depicts an output 950 from the machine learning model which corresponds to the example actual output 855 as depicted in FIG. 8B. According to embodiments, the output 950 may include three channels: a red channel, a blue channel, and a green channel.

Figure 9B:
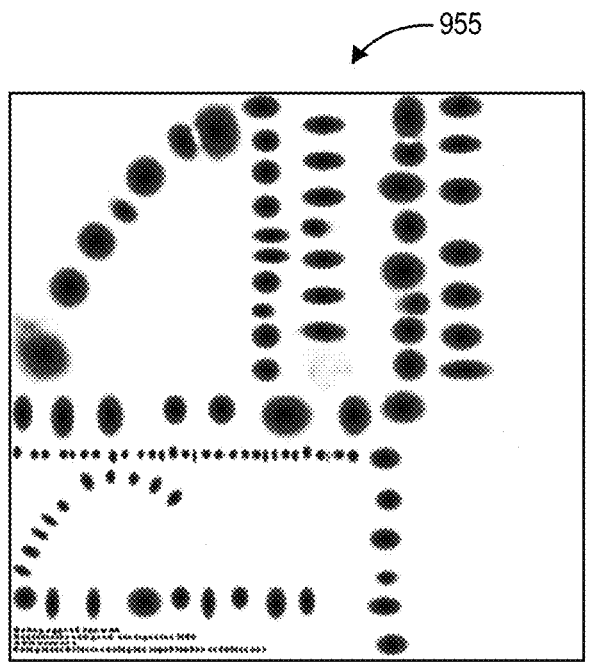
Figure 9C:
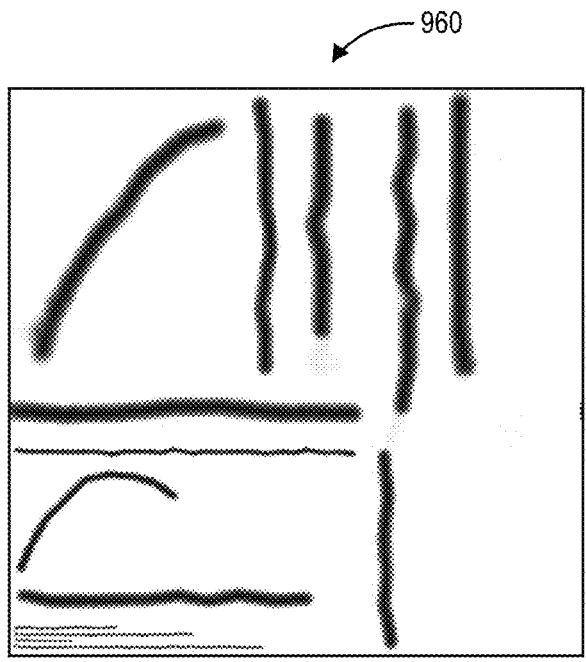

FIG. 9B illustrates a plane 955 corresponding to the red channel. According to embodiments, the plane 955 highlights blobs corresponding to the individual glyphs. FIG. 9C illustrates a plane 960 corresponding to the blue channel. According to embodiments, the plane 960 highlights lines of text, where the lines may represent sequences of glyphs meant to be grouped together (e.g., in words, phrases, or the like).

Figure 9D:
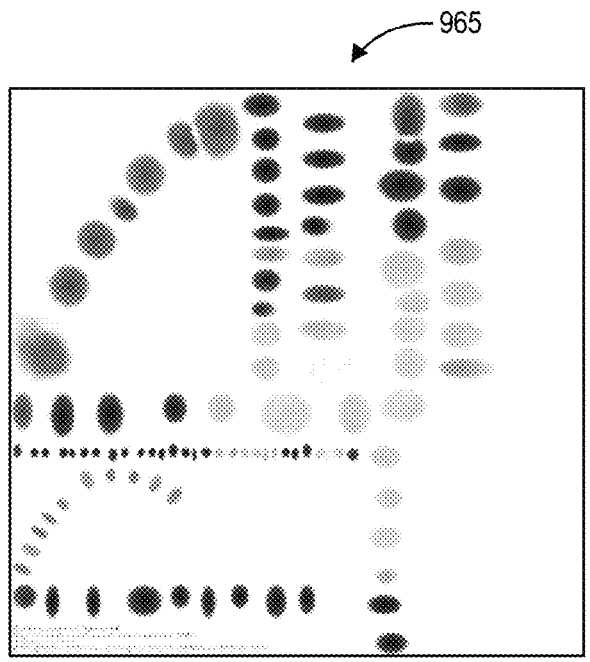

FIG. 9D illustrates a plane 965 corresponding to the green channel. According to embodiments, the plane 965 indicates a legibility degree of each blob as indicated in the plane 955 of FIG. 9B. In the implementation as depicted in FIG. 9D, the darker the blob in the plane 965 (i.e., the more green the blob), the more legible the corresponding glyph, and vice-versa. Thus, when the individual planes 955, 960, 965 are combined to form the output 950 of FIG. 9A, the composition and color of the output 950 indicates the legibility of the underlying text. For example, glyphs that appear more red in color in the output 950 are associated with text that is less legible because these glyphs are lighter (i.e., less green) in the plane 965. Similarly, glyphs that appear more orange/yellow in color in the output 950 are associated with text that is more legible because these glyphs are darker (i.e., more green) in the plane 965.

According to embodiments, a user may use the electronic device to review the output 950 to assess legibility of the text, to contemplate any changes to the design, or for other purposes. In an example scenario, the user may review the indicated text legibility in combination with the blue channel plane 960 to assess which words or phrases may have a low (or high) degree of text legibility, and determine if and how the words or phrases should be adjusted in the original design of the electronic document. An application(s) executable by the electronic device may enable to the user to review the outputs from the machine learning model and/or facilitate any changes to the designs.

Figure 10:
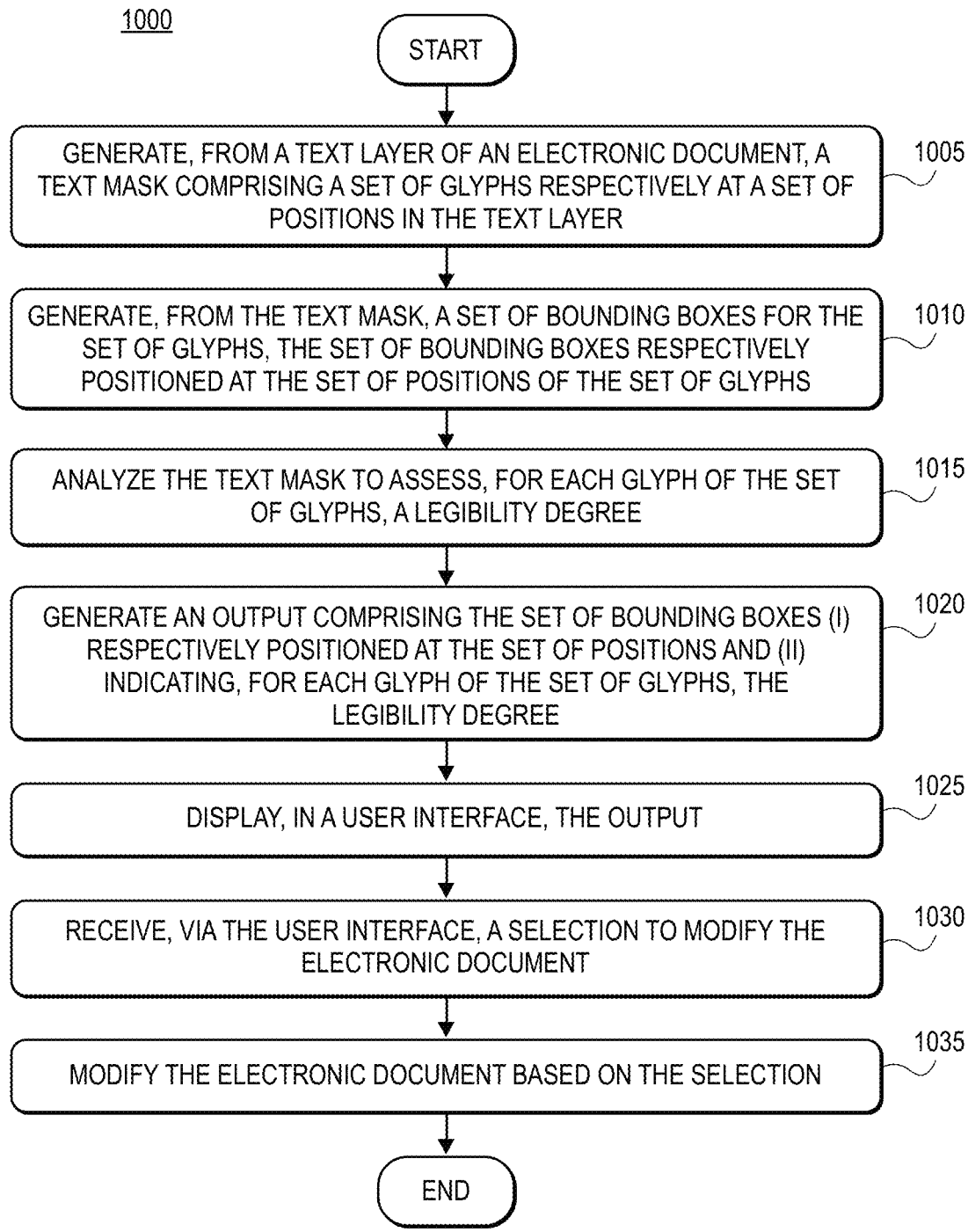
FIG. 10 illustrates an example flow diagram of assessing text legibility in an electronic document, in accordance with some embodiments.

FIG. 10 depicts is a block diagram of an example method 1000 of assessing text legibility in an electronic document. The method 1000 may be facilitated by an electronic device (such as the central server 110 and/or any of the devices 103, 104, 105 as depicted in FIG. 1A). In embodiments, the electronic device may operate or interface with a virtual design platform, such as via a website, application, or the like. Further, the electronic document may include a background layer and a text layer.

The method 1000 may begin when the electronic device generates (block 1005), from the text layer of the electronic document, a text mask comprising a set of glyphs respectively at a set of positions in the text layer. Further, the electronic device may generate (block 1010), from the text mask, a set of bounding boxes for the set of glyphs, the set of bounding boxes respectively positioned at the set of positions of the set of glyphs.

The electronic device may analyze (block 1015) the text mask to assess, for each glyph of the set of glyphs, a legibility degree. Additionally, the electronic device may generate (block 1020) an output comprising the set of bounding boxes (i) respectively position at the set of positions, and (ii) indicating, for each glyph of the set of glyphs, the legibility degree. In embodiments, the output may indicate, for each glyph of the set of glyphs, the legibility degree as a shading of each bounding box of the set of bounding boxes.

In embodiments, the electronic device may analyze the text mask to calculate, for each glyph of the set of glyphs, an antialiasing degree, wherein the output may indicate, for each glyphs of the set of glyphs, the antialiasing degree. In alternative or additional embodiments, the electronic device may generate a gradient of the text mask, generate a gradient of the electronic document, subtract the gradient of the electronic document from the gradient of the text mask to generate a difference of gradients, and analyze the difference of gradients to assess, for each glyph of the set of glyphs, the legibility degree. To subtract the gradient of the electronic document from the gradient of the text mask, the electronic device may remove, from the difference of gradients, a set of locations in which each of a set of corresponding values is negative.

The electronic device may display (block 1025), in a user interface, the output. Accordingly, the electronic device may enable a user to review the output displayed in the user interface. The electronic device may also receive (block 1030), via the user interface, a selection to modify the electronic document. In embodiments, the selection to modify the electronic device may be any type of modification, deletion, addition, or the like, to any of the content or to a characteristic(s) of the electronic device. Additionally, the electronic device may modify (block 1035) the electronic document based on the selection. According to embodiments, the electronic device may display, in the user interface, the modified electronic document and/or other content.

Figure 11:
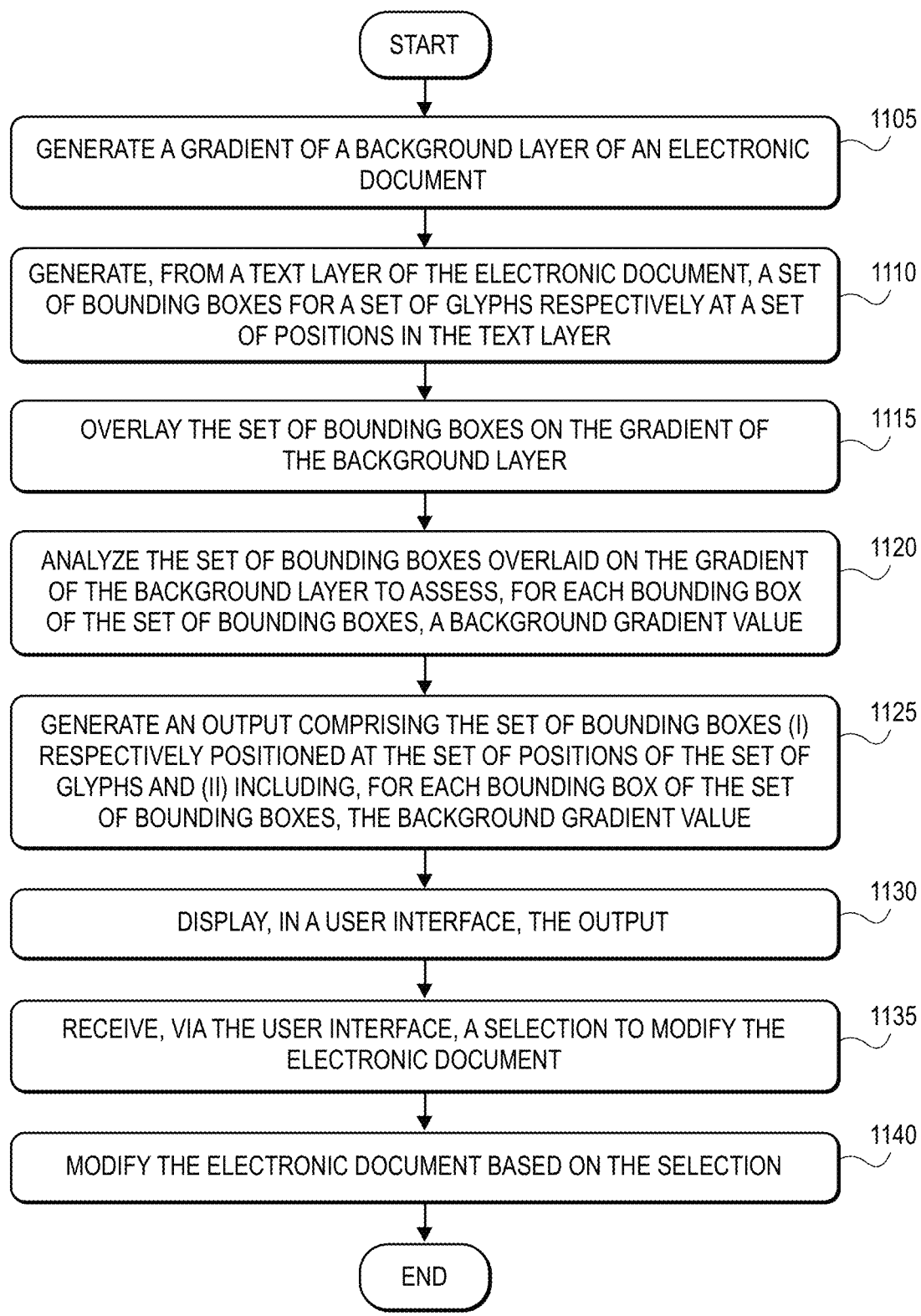
FIG. 11 illustrates an example flow diagram of assessing text legibility in an electronic document, in accordance with some embodiments.

FIG. 11 depicts is a block diagram of an example method 1100 of assessing text legibility in an electronic document. The method 1100 may be facilitated by an electronic device (such as the central server 110 and/or any of the devices 103, 104, 105 as depicted in FIG. 1A). In embodiments, the electronic device may operate or interface with a virtual design platform, such as via a website, application, or the like. Further, the electronic document may include a background layer and a text layer.

The method may begin when the electronic device generates (block 1105) a gradient of the background layer of the electronic document. In embodiments, the electronic device may generate the gradient of the background layer using a color space. The electronic device may also generate (block 1110), from the text layer of the electronic document, a set of bounding boxes for a set of glyphs respectively at a set of positions in the text layer. Further, the electronic device may overlay (block 1115) the set of bounding boxes on the gradient of the background layer.

The electronic device may analyze (block 1120) the set of bounding boxes overlaid on the gradient of the background layer to assess, for each bounding box of the set of bounding boxes, a background gradient value. Further, the electronic device may generate (block 1125) an output comprising the set of bounding boxes (i) respectively positioned at the set of positions of the set of glyphs and (ii) including, for each bounding box of the set of bounding boxes, the background gradient value. In embodiments, the output may indicate, for each bounding box of the set of bounding boxes, the background gradient value as a shading of each bounding box of the set of bounding boxes.

The electronic device may display (block 1130), in a user interface, the output. Accordingly, the electronic device may enable a user to review the output displayed in the user interface. The electronic device may also receive (block 1135), via the user interface, a selection to modify the electronic document. In embodiments, the selection to modify the electronic device may be any type of modification, deletion, addition, or the like, to any of the content or to a characteristic(s) of the electronic device. Additionally, the electronic device may modify (block 1140) the electronic document based on the selection. According to embodiments, the electronic device may display, in the user interface, the modified electronic document and/or other content.

Figure 12:
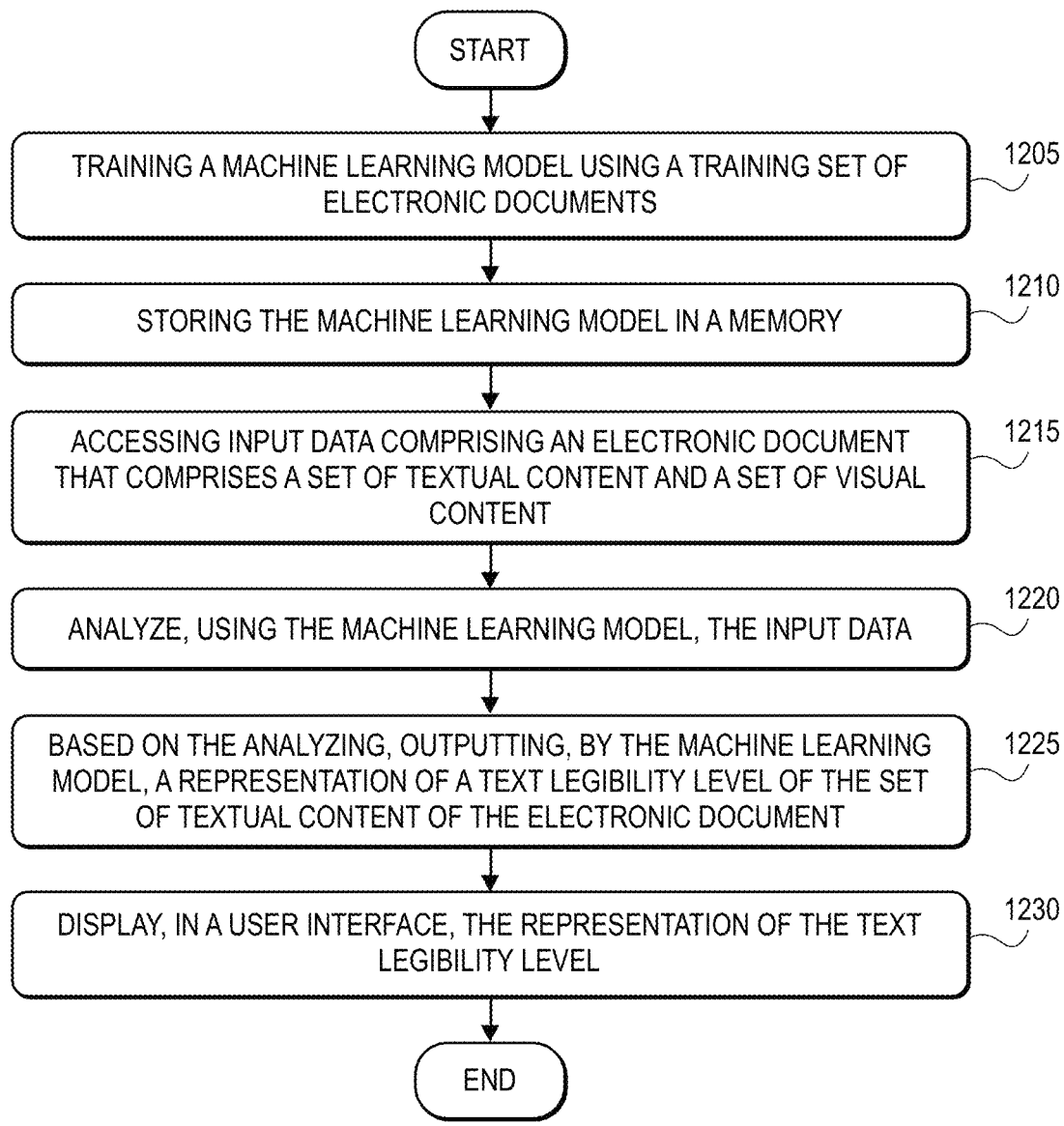
FIG. 12 illustrates an example flow diagram of using machine learning to assess text legibility in an electronic document, in accordance with some embodiments.

FIG. 12 depicts is a block diagram of an example method 1200 of using machine learning to assess text legibility in an electronic document. The method 1200 may be facilitated by an electronic device (such as the central server 110 and/or any of the devices 103, 104, 105 as depicted in FIG. 1A). In embodiments, the electronic device may operate or interface with a virtual design platform, such as via a website, application, or the like.

The method may begin when the electronic device trains (block 1205) a machine learning model using a training set of electronic documents. In embodiments, each of the training set of electronic documents may include a training set of textual content, a training set of visual content, and a training representation of a text legibility level of the training set of textual content. In embodiments, the electronic device may train the machine learning model by removing, from each of the training set of electronic documents, at least a portion of the training set of textual content, and training the machine learning model using the training set of electronic documents with at least the portion of the training set of textual content removed therefrom. The electronic device may store (block 1210) the machine learning model in a memory.

The electronic device may access (block 1215) input data comprising the electronic document that comprises a set of textual content and a set of visual content. The electronic device may analyze (block 1220), using the machine learning model, the input data.

Based on the analyzing, the electronic device may output (block 1225), by the machine learning model, a representation of a text legibility level of the set of textual content of the electronic document. According to embodiments, the electronic device may output, by the machine learning model, a red-green-blue (RGB) representation of the text legibility level, where the RGB representation may include (i) a first image of a set of detected characters, (ii) a second image of a set of legibility values corresponding to the set of detected characters, and (iii) a third image of a set of text lines.

Additionally or alternatively, the electronic device may calculate, by the computer processor using the red-green-blue (RGB) representation, a measure of the text legibility level of the set of textual content. In embodiments, in calculating the measure of the text legibility level, the electronic device may: generate a fourth image representing a difference between the second image of the set of legibility values and the first image of the set of detected characters, wherein the fourth image depicts a set of visual representations of a set of glyphs present in the set of textual content of the electronic document; ascertain, from the fourth image, at least a portion of the set of visual representations of the set of glyphs that do not meet a threshold characteristic; modify, by the computer processor, the fourth image by removing at least the portion of the set of visual representations; and calculate, from the fourth image that was modified, the measure of the text legibility level of the set of textual content. Further, in embodiments, to calculate, from the fourth image that was modified, the measure of the text legibility level, the electronic device may determine a ratio of a size of a remaining portion of the set of visual representations in the fourth image to a size of the electronic document, and calculate, based on the ratio, the measure of the text legibility level of the set of textual content.

The electronic device may display (block 1230), in a user interface, the representation of the text legibility level. Accordingly, the electronic device may enable a user to review the representation and/or modify the electronic document. If the user modifies the electronic document, the electronic device may facilitate the modification, analyze the modification using the machine learning model, and display any outputs or results. Additionally or alternatively, the electronic device may update the machine learning model with results of the outputting in block 1225.

Although the following text sets forth a detailed description of numerous different embodiments, it should be understood that the legal scope of the invention may be defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that may be permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that may be temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it may be communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

As used herein, the terms "comprises," "comprising," "may include," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also may include the plural unless it is obvious that it is meant otherwise.

This detailed description is to be construed as examples and does not describe every possible embodiment, as describing every possible embodiment would be impractical.

What is claimed is:

1. A computer-implemented method of assessing text legibility in an electronic document comprising a background layer and a text layer, the computer-implemented method comprising:
    generating, by a computer processor from the text layer of the electronic document, a text mask indicating textual or graphical content included in the text layer, the text mask comprising a set of glyphs respectively at a set of positions in the text layer;
    generating, by the computer processor from the text mask, a set of bounding boxes for the set of glyphs, the set of bounding boxes respectively positioned at the set of positions of the set of glyphs;
    analyzing, by the computer processor, the text mask to assess, for each glyph of the set of glyphs, a legibility degree; and
    generating, by the computer processor, an output comprising the set of bounding boxes (i) respectively positioned at the set of positions and (ii) indicating, for each glyph of the set of glyphs, the legibility degree, wherein the output indicates, for each glyph of the set of glyphs, the legibility degree as a shading of each bounding box of the set of bounding boxes.

2. The computer-implemented method of claim 1, further comprising:
    displaying, in a user interface, the output.

3. The computer-implemented method of claim 2, further comprising:
    receiving, via the user interface, a selection to modify the electronic document; and
    modifying, by the computer processor, the electronic document based on the selection.

4. The computer-implemented method of claim 1, wherein analyzing the text mask comprises:
    analyzing, by the computer processor, the text mask to calculate, for each glyph of the set of glyphs, an antialiasing degree, wherein the output indicates, for each glyph of the set of glyphs, the antialiasing degree.

5. The computer-implemented method of claim 1, wherein analyzing the text mask comprises:
    generating, by the computer processor, a gradient of the text mask;
    generating, by the computer processor, a gradient of the electronic document;
    subtracting, by the computer processor, the gradient of the electronic document from the gradient of the text mask to generate a difference of gradients; and
    analyzing, by the computer processor, the difference of gradients to assess, for each glyph of the set of glyphs, the legibility degree.

6. The computer-implemented method of claim 5, wherein subtracting the gradient of the electronic document from the gradient of the text mask comprises:

removing, from the difference of gradients, a set of locations in which each of a set of corresponding values is negative.

7. A system for assessing text legibility in an electronic document comprising a background layer and a text layer, comprising:
a memory storing a set of computer-readable instructions; and
a processor interfacing with the memory, and configured to execute the set of computer-readable instructions to cause the processor to:
generate, from the text layer of the electronic document, a text mask indicating textual or graphical content included in the text layer, the text mask comprising a set of glyphs respectively at a set of positions in the text layer,
generate, from the text mask, a set of bounding boxes for the set of glyphs, the set of bounding boxes respectively positioned at the set of positions of the set of glyphs,
analyze the text mask to assess, for each glyph of the set of glyphs, a legibility degree, and
generate an output comprising the set of bounding boxes (i) respectively positioned at the set of positions and (ii) indicating, for each glyph of the set of glyphs, the legibility degree, wherein the output indicates, for each glyph of the set of glyphs, the legibility degree as a shading of each bounding box of the set of bounding boxes.

8. The system of claim 7, further comprising:
a user interface;
wherein the processor is configured to execute the set of computer-readable instructions to further cause the processor to:
cause the user interface to display the output.

9. The system of claim 8, wherein the processor is configured to execute the set of computer-readable instructions to further cause the processor to:
receive, via the user interface, a selection to modify the electronic document, and modify the electronic document based on the selection.

10. The system of claim 7, wherein to analyze the text mask, the processor is configured to:
analyze the text mask to calculate, for each glyph of the set of glyphs, an antialiasing degree, wherein the output indicates, for each glyph of the set of glyphs, the antialiasing degree.

11. The system of claim 7, wherein to analyze the text mask, the processor is configured to:
generate a gradient of the text mask,
generate a gradient of the electronic document,
subtract the gradient of the electronic document from the gradient of the text mask to generate a difference of gradients, and
analyze the difference of gradients to assess, for each glyph of the set of glyphs, the legibility degree.

12. The system of claim 11, wherein to subtract the gradient of the electronic document from the gradient of the text mask, the processor is configured to:
remove, from the difference of gradients, a set of locations in which each of a set of corresponding value is negative.

13. A computer-implemented method of assessing text legibility in an electronic document comprising a background layer and a text layer, the computer-implemented method comprising:
generating, by a computer processor, a gradient of the background layer of the electronic document;
generating, by the computer processor from the text layer, a set of bounding boxes for a set of glyphs respectively at a set of positions in the text layer;
overlaying, by the computer processor, the set of bounding boxes on the gradient of the background layer;
analyzing, by the computer processor, the set of bounding boxes overlaid on the gradient of the background layer to assess, for each bounding box of the set of bounding boxes, a background gradient value; and
generating, by the computer processor, an output comprising the set of bounding boxes (i) respectively positioned at the set of positions of the set of glyphs and (ii) indicating, for each bounding box of the set of bounding boxes, the background gradient value, wherein the output indicates, for each bounding box of the set of bounding boxes, the background gradient value as a shading of each bounding box of the set of bounding boxes.

14. The computer-implemented method of claim 13, further comprising:
displaying, in a user interface, the output.

15. The computer-implemented method of claim 14, further comprising:
receiving, via the user interface, a selection to modify the electronic document; and
modifying, by the computer processor, the electronic document based on the selection.

16. The computer-implemented method of claim 13, wherein generating the gradient of the background layer comprises:
generating, by the computer processor, the gradient of the background layer using a color space.

17. The computer-implemented method of claim 13, wherein a portion of the set of bounding boxes that overlap on the gradient of the background layer, and wherein analyzing the set of bounding boxes overlaid on the gradient of the background layer comprises:
analyzing, by the computer processor, the portion of the set of bounding boxes, to assess, for each bounding box in the portion of the set of bounding boxes, the background gradient value corresponding to a portion of the gradient within the bounding box.

* * * * *